US008514213B2

(12) United States Patent
van Veenendaal et al.

(10) Patent No.: US 8,514,213 B2
(45) Date of Patent: Aug. 20, 2013

(54) COMMON DRIVING OF DISPLAYS

(75) Inventors: Erik van Veenendaal, Eindhoven (NL); Coert Petrus Ansems, Eindhoven (NL); Leendert Marinus Hage, Eindhoven (NL); Hjalmar Edzer Ayco Huitema, Eindhoven (NL)

(73) Assignee: Creator Technology B.V., Breda (NL)

( * ) Notice: Subject to any disclaimer, the term of this patent is extended or adjusted under 35 U.S.C. 154(b) by 412 days.

(21) Appl. No.: 12/903,895

(22) Filed: Oct. 13, 2010

(65) Prior Publication Data

US 2012/0092319 A1 Apr. 19, 2012

(51) Int. Cl.
*G09G 5/00* (2006.01)
*G06F 3/038* (2006.01)

(52) U.S. Cl.
USPC ............................ 345/211; 345/107; 359/296

(58) Field of Classification Search
USPC .......... 345/107, 204, 208, 211, 690; 359/296
See application file for complete search history.

(56) References Cited

U.S. PATENT DOCUMENTS

| | | | | |
|---|---|---|---|---|
| 4,814,760 | A | 3/1989 | Johnston et al. | |
| 5,617,111 | A | 4/1997 | Saitoh | |
| 6,906,851 | B2 | 6/2005 | Yuasa | |
| 2005/0179852 | A1 | 8/2005 | Kawai | |
| 2005/0231461 | A1 | 10/2005 | Raap et al. | |
| 2007/0035510 | A1 | 2/2007 | Zhou et al. | |
| 2008/0143668 | A1* | 6/2008 | Shin et al. | 345/107 |

FOREIGN PATENT DOCUMENTS

| | | | |
|---|---|---|---|
| JP | 2004-094168 | A | 3/2004 |
| WO | WO 01/02899 | A2 | 1/2001 |
| WO | WO 2005/031688 | A1 | 4/2005 |
| WO | WO 2005/034075 | A1 | 4/2005 |
| WO | WO 2005/055187 | A1 | 6/2005 |
| WO | WO 2008/054209 | A2 | 5/2008 |
| WO | WO 2008/054210 | A2 | 5/2008 |

OTHER PUBLICATIONS

International Search Report and Written Opinion for PCT/NL2011/050696 dated Dec. 12, 2011.

* cited by examiner

*Primary Examiner* — Stephen Sherman

(57) ABSTRACT

A display driving arrangement is described wherein, during a scan line driving phase, a column driver is controlled to provide a plurality of driving column voltages to the source terminals and the row driver is controlled to provide scanning row selection voltages to the gate terminals for sequentially updating the each pixel having an initial pixel state, voltages with said plurality of driving column voltages to attain, for each initial pixel state, an initial common pixel state. During a common driving phase the column driver is controlled to provide a uniform column voltage to the source terminals to update the plurality of pixel voltages with a uniform column voltage. In addition, the row driver is controlled to provide row select voltages with a gate swing that is lower during the common driving phase than during the row driving phase so as to drive the pixels from a respective the initial common state to a respective final common state. The pixel states may differ from each other at least during a part of the common driving phase or even during the entire common driving phase, so that initial and final common states and intermediate states may differ from pixel to pixel.

17 Claims, 31 Drawing Sheets

HVCD to black

COMMON DRIVING OF DISPLAYS

FIELD AND BACKGROUND OF THE INVENTION

The present invention relates to display devices, and more particularly to driving an active matrix electrophoretic display by varying a common voltage.

Displays, such as liquid crystal (LC) and electrophoretic displays include particles suspended in a medium sandwiched between a drive or pixel terminal and a common terminal. The pixel terminal includes pixel drivers, such as an array of thin film transistors (TFTs) that are controlled to switch on and off to form an image on the display. This conventional method of driving a display is referred to as scan line driving. The voltage difference ($V_{Eink}=V_{CE}-V_{px}$ as shown in FIGS. 3 and 5A) between a TFT or the pixel terminal 101 and the common terminal 102, which is on the viewer's side of the display, causes migration of the suspended particles, thus forming the image. Displays with an array of individually controlled TFTs or pixels are referred to as active-matrix displays.

In order to change image content on an electrophoretic display, such as from E Ink Corporation for example, new image information is written for a certain amount of time, such as 500 ms to 1000 ms. As the refresh rate of the active-matrix is usually higher, this results in addressing the same image content during a number of frames, such as at a frame rate of 50 Hz, 25 to 50 frames. Electrophoretic active matrix displays are applied in many applications including, for example, e-readers. Although this text refers generally to E Ink as examples of electrophoretic displays, it is understood that the invention can be applied to electrophoretic displays in general, such as for example SiPix where the microcups are filled with white particles in a black fluid.

Circuitry to drive displays, such as electrophoretic displays, is well known, such as described in U.S. Pat. No. 5,617,111 to Saitoh, International Publication No. WO 2005/034075 to Johnson, International Publication No. WO 2005/055187 to Shikina, U.S. Pat. No. 6,906,851 to Yuasa, and U.S. Patent Application Publication No. 2005/0179852 to Kawai; U.S. Patent Application Publication No. 2005/0231461 to Raap; U.S. Pat. No. 4,814,760 to Johnston; International Publication No. WO 01/02899 to Albert; Japanese Patent Application Publication Number 2004-094168, and WO2008/054209 and WO2008/054210 to Markvoort, each of which is incorporated herein by reference in its entirety.

The grey level of a pixel will be referred to as the pixel state P and its value is measured e.g. by the reflectivity of the pixel. The pixel state P of a pixel in an electrophoretic display remains stable when the driving voltage differential $V_{Eink}$ is switched off, i.e. $V_{Eink}=0$V. The pixel state P can be anywhere on a grey scale between the two extreme pixel states of the pixel, such as for example black and white. This pixel state stability in the absence of driving voltage is an advantage, as it means that power is only required during a display update. However, the disadvantage is that driving an electrophoretic display is complicated: in order to drive the display one has to know the current pixel states and the intended new pixel states of the display. Typically a so-called Look Up Table (LUT) is used wherein, for example for 16 grey levels this LUT provides 16×16 waveforms or scan line driving values, giving a recipe for a pixel to be driven from each of the 16 possible grey scales to each of these 16 grey scales.

Making a LUT is complicated because the uniformity of the grey levels, for example the percentage of reflectivity of the pixels, must be assured. The difference between grey levels must be equidistant in reflectivity independent of the current image (image history) and independent of the new image (crosstalk). Non-uniformities in TFT backplane and electrophoretic front plane make this problem more imminent. There is the need for an update that is as short as possible. Accordingly, there is a need for better displays, such as displays that tackle the complications of making a satisfactory LUT and provide a more uniform and reliable image update. Additionally there is a need to conserve energy and minimize stresses caused, for example, by voltage differences across various parts of the circuitry, such as the column-row crossings.

SUMMARY OF THE INVENTION

In a first aspect there is provided a display device comprising a plurality of transistors, a column driver, a row driver, a common driver, pixels, and a controller.

Each transistor comprises a source terminal, a gate terminal, and a drain terminal. The column driver is connected to the source terminals for providing column voltages. The row driver is connected to the gate terminals for providing a row select voltage. The pixels each have a pixel state that is driven by a driving voltage differential between a pixel voltage, applied to a pixel terminal, and a common voltage, applied to a common terminal. The pixel terminal is connected to a drain terminal of a corresponding transistor. The common driver is connected to the common terminals for providing a variable common voltage. The controller controls the operation of the column driver, row driver, and common driver for driving the pixels in a control sequence comprising a scan line driving phase and a common driving phase.

During the scan line driving phase, the column driver is controlled to provide a plurality of driving column voltages to the source terminals and the row driver is controlled to provide scanning row selection voltages to the gate terminals for sequentially updating each pixel having an initial pixel state, with said plurality of driving column voltages to attain, for each initial pixel state, an initial common pixel state.

During the common driving phase the column driver is controlled to provide a uniform column voltage to the source terminals. This voltage is used for updating the plurality of pixel voltages with a uniform column voltage.

In addition, the row driver is controlled to provide row select voltages with a gate swing that is lower during the common driving phase than during the row driving phase. The row driver may alternatively or additionally be controlled to provide a uniform row select voltage during multiple scan periods to keep the transistors in a conducting state, thereby maintaining said uniform column voltage on the pixel terminals so as to drive the pixels from a respective initial common state to a respective final common state. The pixel states may differ from each other at least during a part of the common driving phase or even during the entire common driving phase, so that initial and final common states and intermediate states may differ from pixel to pixel.

The lower gate swing in the common driving phase is made possible by the fact that during this phase all pixels are driven with the same uniform (common) voltage, instead of a spread of voltages as during the pixel driving phase. The term 'common driving' thus refers to a period where all pixels are driven with a common voltage substantially simultaneously supplied to the pixel cells via respective common electrode and column electrodes.

It is one of the concepts of the present invention that common driving is applied for all parts of the waveforms in the LUT that are identical for all N×N transitions, where N is the number of pixel states (grey levels) a pixel will typically attain. In a typical current LUT it is found that 20% to 40% of the total update time is common for all N×N transitions. In that case the entire display switches with the same voltage between pixel and common, and this can be done in the common driving phase. During this phase the common voltage $V_{CE}$ provided to the common terminal of the pixels is either all negative or all positive relative to the pixel voltages $V_{px}$ provided at the pixel terminals. This causes the pixels to be commonly driven to either black or white depending on the sign of the relative voltage.

Advantageously, the controller comprises a LUT for controlling the column driver, during the scan line driving phase, to first provide driving column voltages so as to drive the pixels from any of the N possible pixel states to the initial common pixel state. It is noted that, depending on the original pixel state (N possibilities) there can be (small) differences or non-uniformities in the initial common pixel state.

In a further embodiment a common driving phase is used to bring the pixels from this initial common state to an intermediate common state that is equal to an extreme pixel state $P_E$ (e.g. a black or white pixel state) for increasing a uniformity of the pixel states. In a further embodiment, the pixels are driven from the intermediate pixel state to a final common state. From this final common state the pixels are driven to any further pixel state of the N possible pixel states.

An advantage of this driving scheme is that the LUT need only contain N+N transitions: N ways to go from the original pixel state to the common state and N ways to go from the final common state to the destination pixel state. This thus greatly simplifies the LUT which normally contains N×N values. An additional advantage from driving the pixels to a common extreme pixel state $P_E$ is that the pixel states will become more uniform. Depending on the original pixel state (N possibilities) there can be (small) differences in the initial common pixel state.

In an advantageous embodiment, the display further comprises a common driving flag $F_{CD}$ that is set in accordance with the LUT to indicate the status of a common driving period. This flag $F_{CD}$ could be implemented in software or hardware, and may also be part of the LUT itself For example, the flag $F_{CD}$ can be (pre)programmed to be raised (e.g., a Boolean value is switched) when a common driving period is foreseen in the LUT. The flag $F_{CD}$ can be monitored, for example, by the controller and/or the various drivers for adjusting their characteristics (such as the gate voltage) in accordance with the common driving period. For example, the raising of the flag $F_{CD}$ could trigger a common driving initialization frame, and the lowering of the flag $F_{CD}$ could trigger a common driving ending frame. Also the raised flag could cause the row driver to supply lower gate voltages during the common driving phase than during the scan line driving phase. Alternatively, there could be more than one flag $F_{CD}$ for indicating various periods of the common driving phase.

In a second aspect a method is provided for driving a display according to the first aspect.

Further areas of applicability of the present systems and methods will become apparent from the detailed description provided hereinafter. It should be understood that the detailed description and specific examples, while indicating exemplary embodiments of the displays and methods, are intended for purposes of illustration only and are not intended to limit the scope of the invention.

BRIEF DESCRIPTION OF THE DRAWINGS

These and other features, aspects, and advantages of the apparatus, systems and methods of the present invention will become better understood from the following description, appended claims, and accompanying drawings where in:

DETAILED DESCRIPTION

The following description of certain exemplary embodiments is merely exemplary in nature and is in no way intended to limit the invention, its application, or uses. In the following detailed description of embodiments of the present systems, devices and methods, reference is made to the accompanying drawings which form a part hereof, and in which are shown by way of illustration specific embodiments in which the described devices and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Figure 1:
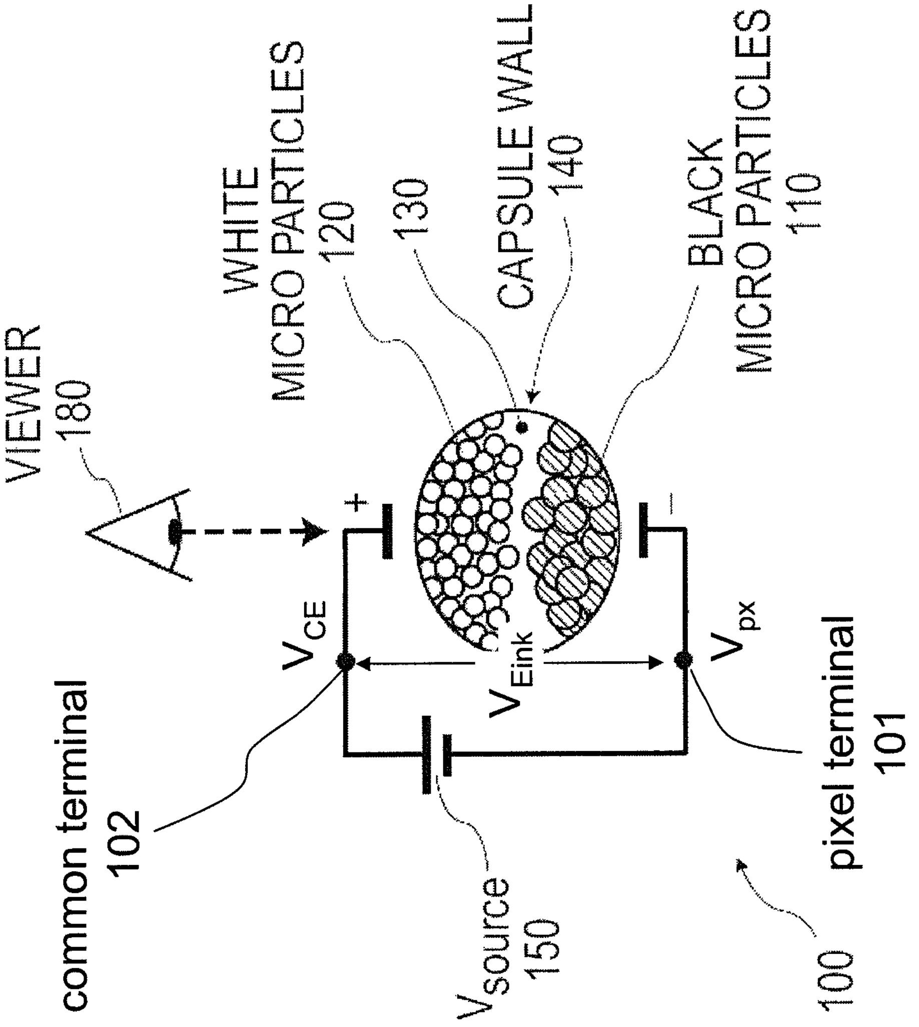
FIG. 1 shows a conventional E-ink display device.

FIG. 1 shows a schematic representation 100 of the E-ink principle, where different color particles, such as black micro-particles 110 and white micro-particles 120 suspended in a medium 130, are encapsulated by the wall of an E-ink capsule 140. Typically, the E-ink capsule 140 has a diameter of approximately 40 microns. A voltage source 150 is connected across a pixel terminal 101 and a common terminal 102 located on the side of the display viewed by a viewer 180. The voltage on the pixel terminal 101 is referred to as the pixel voltage $V_{px}$, while the voltage on the common terminal 102 is referred to as the common voltage $V_{CE}$. The driving voltage differential $V_{Eink}$, defined as the difference between the common voltage $V_{CE}$ and pixel voltage $V_{px}$, results in an electric field over the pixel.

In the presence of an electric field the pigments in the microcapsules move in and out of the field of view; when the electric field is removed the pigments stop moving and the current grey scale is preserved; this effect is known in the art as 'bi-stable'. In this text it is assumed for conciseness that the pixels comprise positively charged black micro-particles and negatively charged white micro-particles. It is understood that any other set of first and second colors could be given to the micro-particles without affecting the working principle. Where there is written that a pixel is in a black state or in a white state, it is understood that micro-particles with a first or second color, respectively, are dominantly present on a viewing side of the pixel. Similarly where there is written that a pixel is in a grey state it is understood that a mix of any particular proportions of the first and second colored micro-particles is present on the viewing side of the pixel.

The relative sizes of the voltages applied at the pixel and common terminals determine the magnitude and the direction of the electric fields through the pixels and therewith the speed and direction of the drifting microparticles. The polarity and absolute magnitude of the voltages that are shown in the figures and text thus mainly serve an exemplary role for particular embodiments of the invention and should not be construed as limiting to its scope. Sometimes the exemplary relative absolute magnitudes of voltages for different driving modes are important because, for example, higher voltage differentials allow for faster pixel switching speeds, but may also lead to shorter lifetime of the electronic components.

Figure 3:
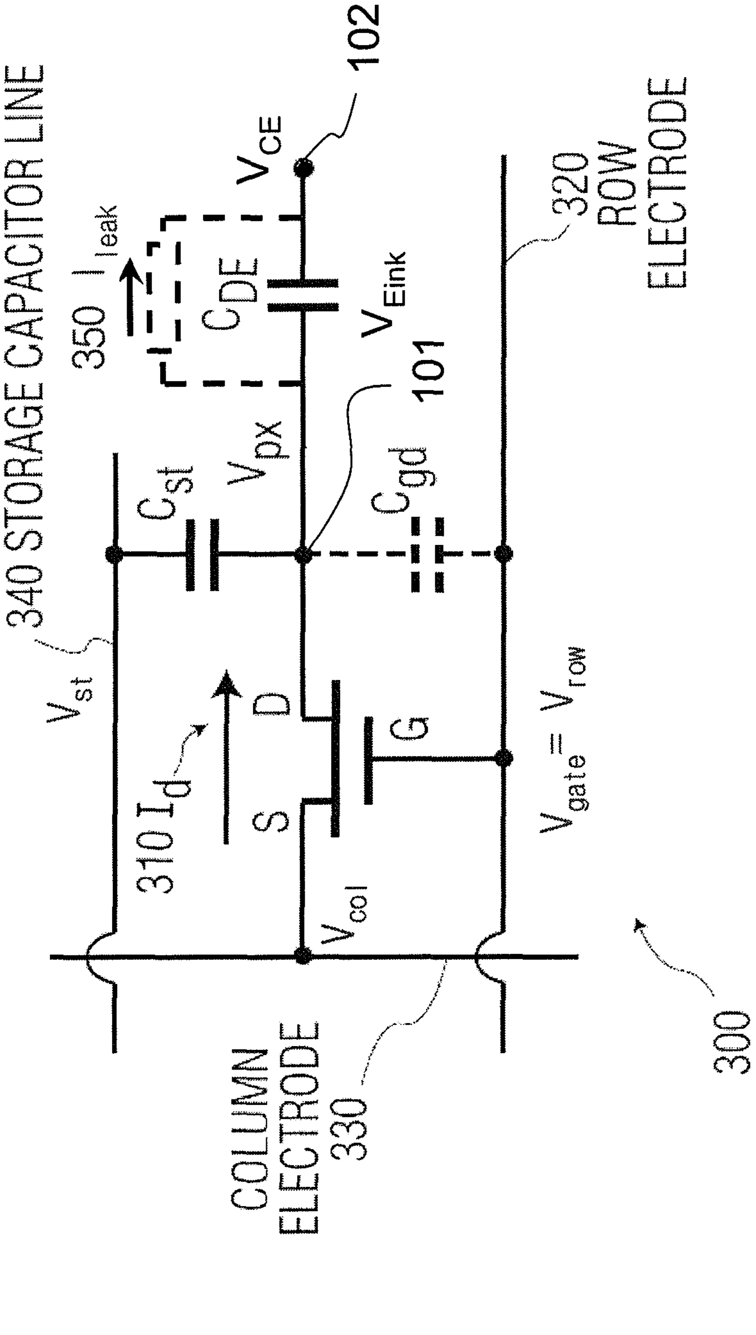
FIG. 3 shows the equivalent circuit of a pixel in a conventional active-matrix display.
Figure 5A:
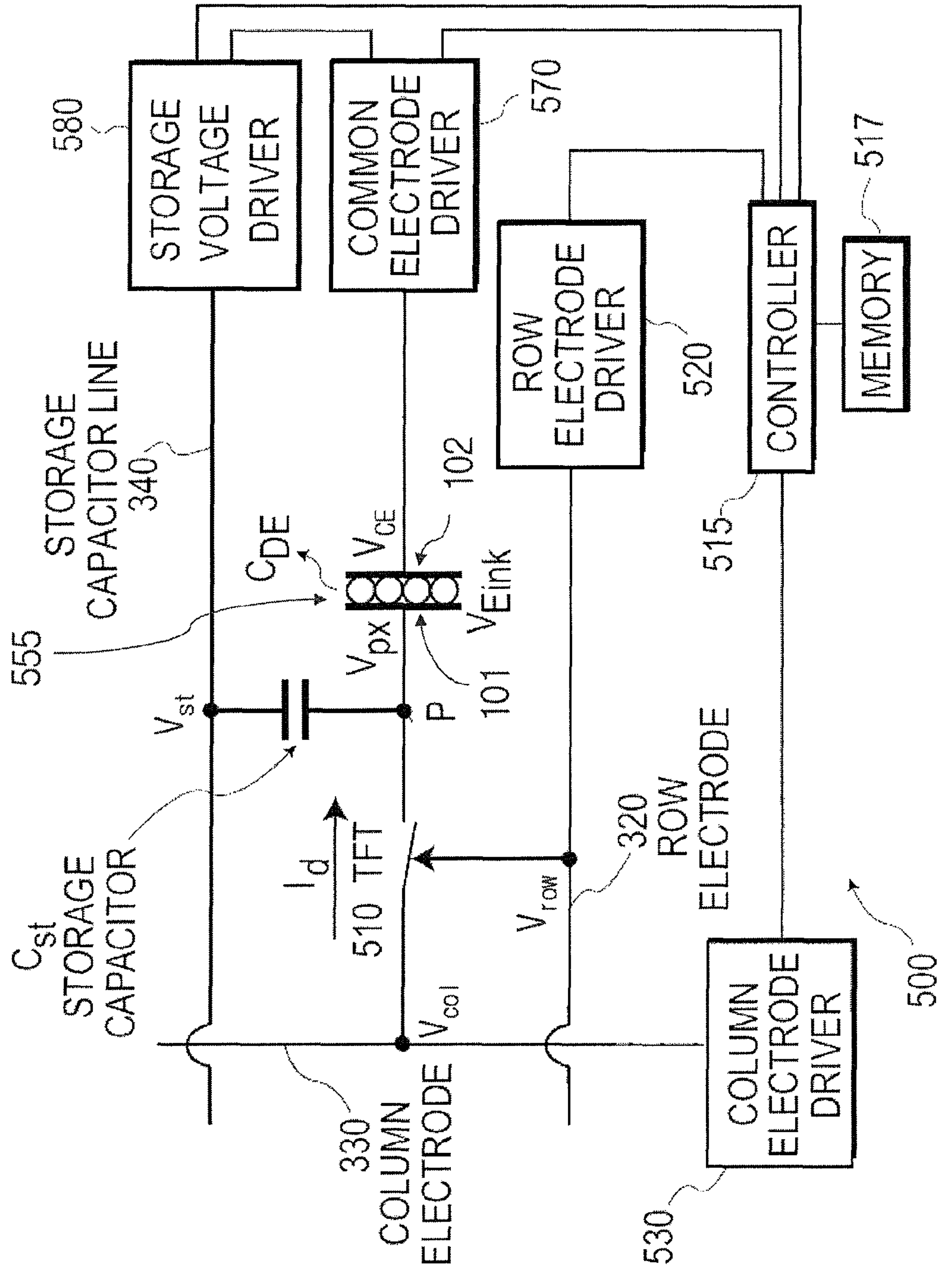
FIG. 5A shows a simplified circuit for the active matrix pixel circuit according to one embodiment.

Addressing of the E-ink 140 from black to white, for example, requires a pixel represented as a pixel capacitor $C_{DE}$ in FIGS. 3 and 5A and connected between pixel terminal 101 and a common terminal 102, to be charged to −15V during 200 ms to 400 ms. That is, the pixel voltage $V_{px}$ at the pixel terminal 101 is charged to −15V, and $V_{Eink}=V_{CE}-V_{px}=0-(-15)=+15V$. During this time, the white particles 120 drift towards the top common terminal 102, while the black particles 110 drift towards the bottom (active-matrix, e.g., TFT, back plane) pixel terminal 101, also referred to as the pixel pad.

Switching to a black screen where the black particles 110 move towards the common terminal 102, requires a positive pixel voltage $V_{px}$ at the pixel terminal 101 with respect to the common voltage $V_{CE}$. In the case where $V_{CE}=0V$ and $V_{px}=+15V$, the driving voltage differential is $V_{Eink}=V_{CE}-V_{px}=0-(+15)=-15V$. When the driving voltage differential $V_{Eink}$ is 0V, such as when both the pixel voltage $V_{px}$ at the pixel terminal 101 and the common voltage $V_{CE}$ are 0V ($V_{px}=V_{CE}=0$), then the E-ink particles 110, 120 do not switch or move.

Figure 2A:
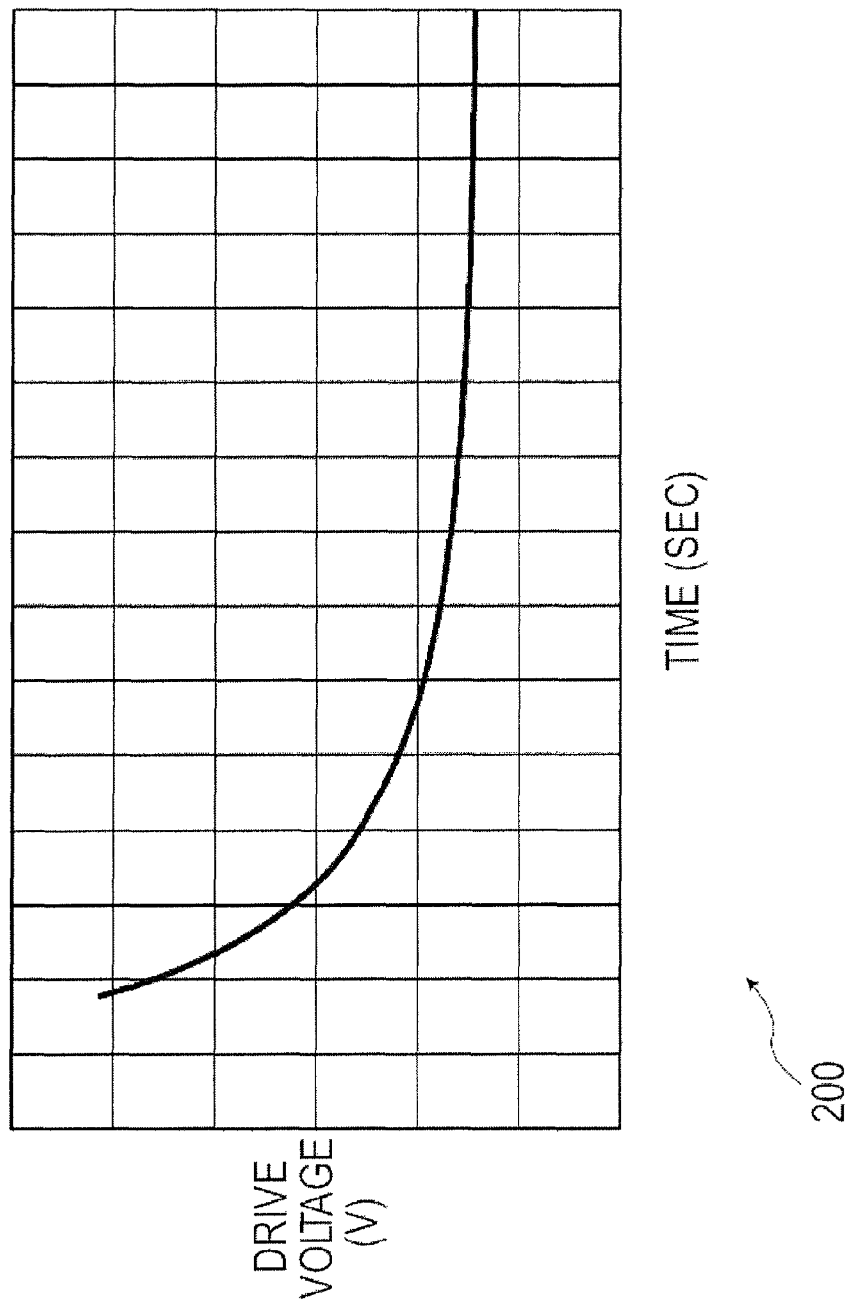
FIG. 2A shows the switching speed of E-ink as a function of the addressing voltage.

FIG. 2A shows a graph 200 of the switching time of the E-ink to switch between the black and white states decreases (i.e., the switching speed increases or is faster) with increasing driving voltage differential $V_{Eink.}$ The graph 200, which shows the driving voltage differential $V_{Eink}$ on the y-axis in volts versus time in seconds, applies similarly to both switching from 95% black to 95% white screen state, and vice verse. It should be noted that the switching time decreases by more than a factor of two when the drive voltage is doubled. The switching speed therefore increases super-linear with the applied drive voltage The typical driving voltage differentials $V_{Eink}$ across the pixel capacitor $C_{DE}$ shown in FIG. 5A are +15V, 0V and −15V. For such voltage levels, the optical switching characteristic of percent reflection versus time is shown in curve 201 of FIG. 2B, where the switching time is approximately 0.25 seconds. This reflection is caused by white micro particles that are present on the viewing side of the pixel, while the black micro particles are absorbing.

Figure 2B:
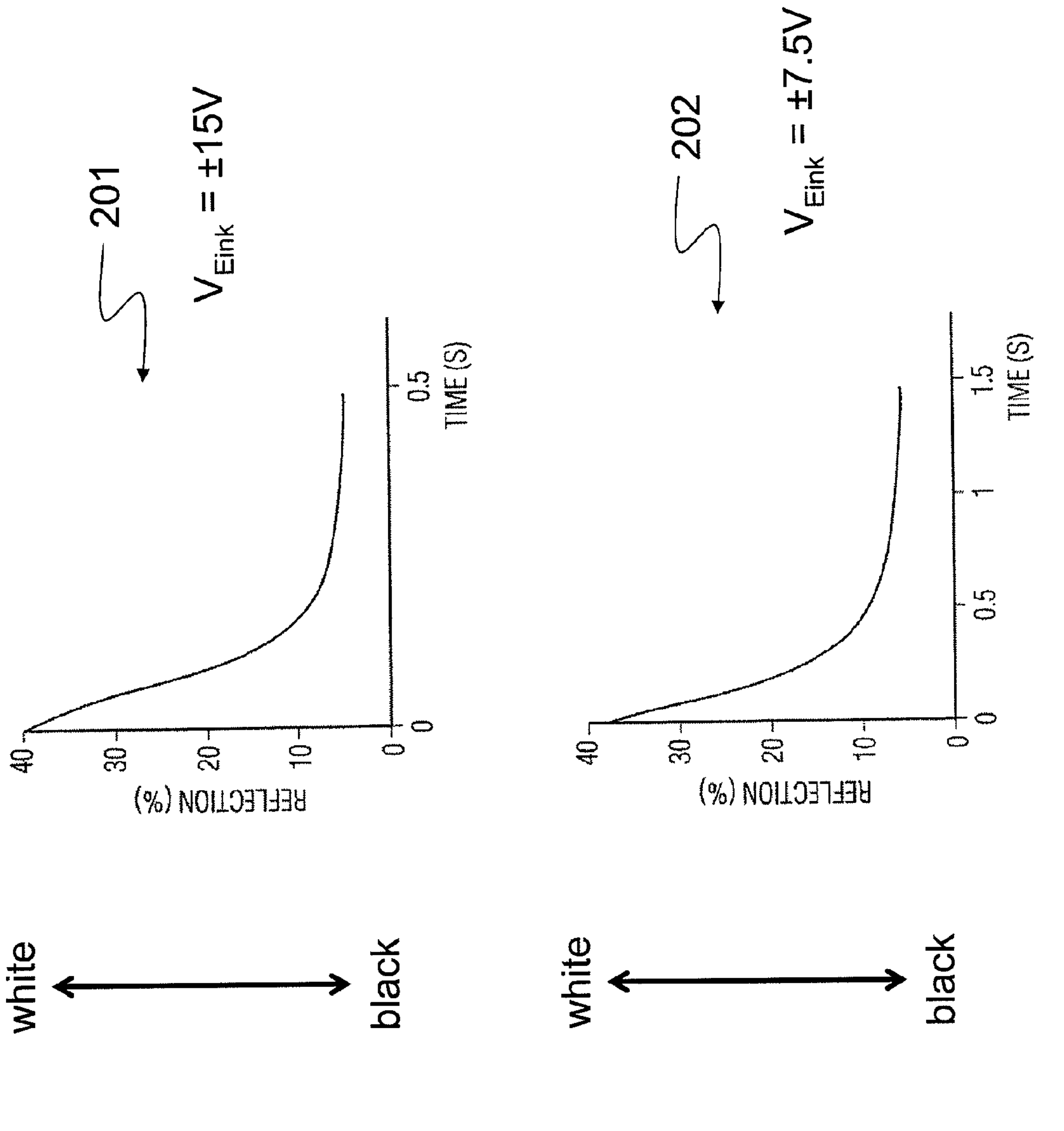
FIG. 2B shows a switching of a pixel for different driving voltages.

If the voltages are reduced from 15V to 7.5V, then switching time is increased to approximately 0.65 seconds, as shown by the curve 202 of FIG. 2B. It should be noted that both curves 201, 202 shown in FIG. 2B have the same behavior or shape; the difference between the two curves 201, 202 is the transition speed, namely, approximately 0.25 seconds for the curve 201 associated with the higher voltage levels of $V_{Eink}=\pm15V$, and approximately 0.65 seconds for the curve 202 associated with the lower voltage levels of $V_{Eink}=\pm7.5V$.

Figure 4:
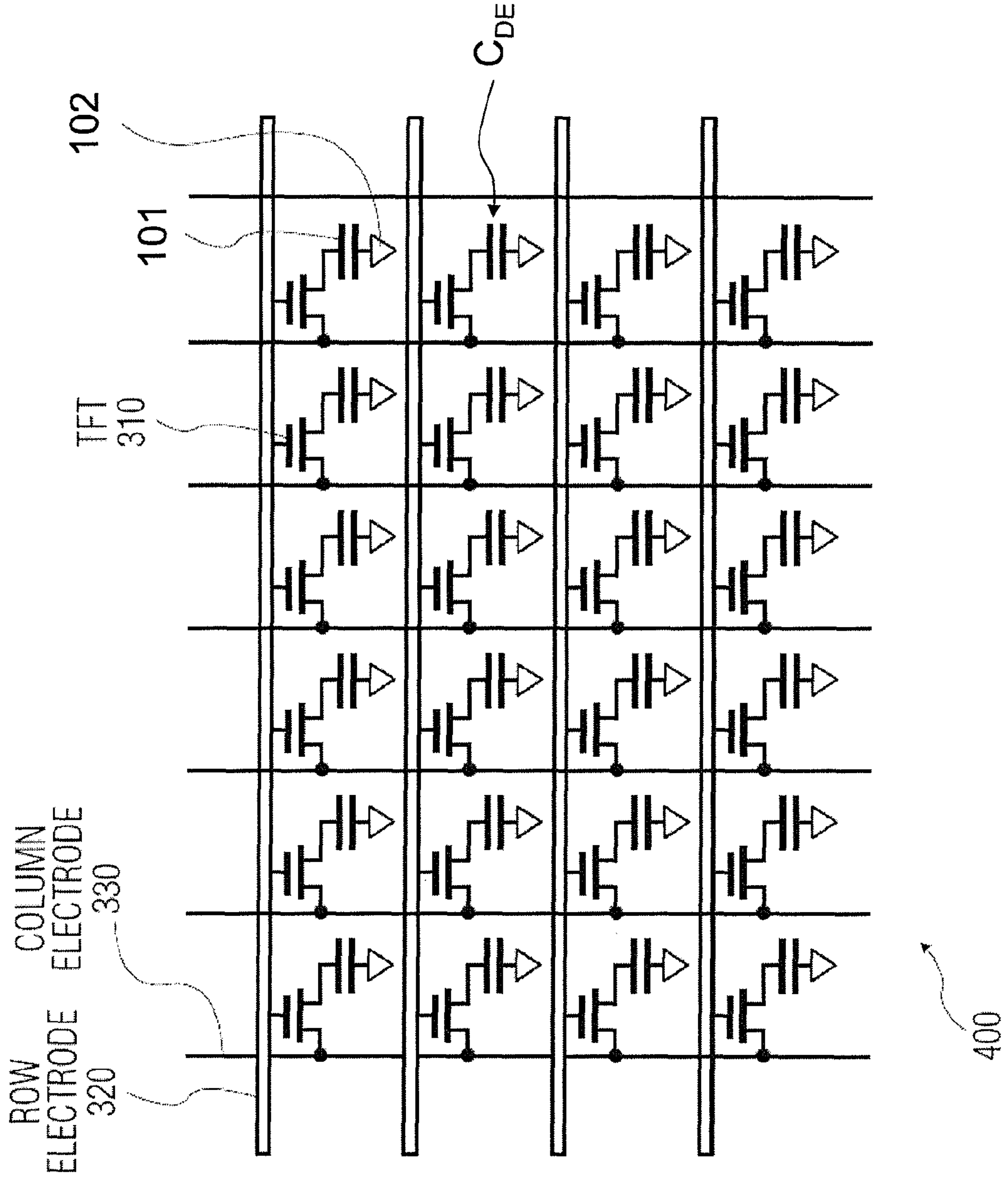
FIG. 4 shows an array of cells of an active-matrix display.

FIG. 3 shows the equivalent circuit 300 for driving a pixel (e.g., capsule 140 in FIG. 1) in an active-matrix display that includes a matrix or array 400 of cells that include one transistor 310 per cell or pixel (e.g., pixel capacitor $C_{DE}$) as shown in FIG. 4. A row of pixels is selected by applying the appropriate select voltage to the select line or row electrode 320 connecting the TFT gates for that row of pixels.

When a row of pixels is selected, a desired voltage may be applied to each pixel via its data line or column electrode 330. When a pixel is selected, it is desired to apply a given voltage to that pixel alone and not to any non-selected pixels. The non-selected pixels should be sufficiently isolated from the voltages circulating through the array for the selected pixels. External controllers and drive circuitry are also connected to the cell matrix 400. The external circuits may be connected to the cell matrix 400 by flex-printed circuit board connections, elastomeric interconnects, tape-automated bonding, chip-on-glass, chip-on-plastic and other suitable technologies. Of course, the controllers and drive circuitry may also be integrated with the active matrix itself.

Electrophoretic displays are relatively slow and, generally speaking, respond to the average pixel voltage during a frame time. This response to the integral in time of the pixel voltage, implies that there are two different types of row-to-row addressing for electrophoretic displays: amplitude modulation driving (grey scales are rendered by modulating the data voltage on the columns) and pulse width modulation (grey scales are rendered by modulating the number of frame times that a certain set voltage is applied).

In the following, two types of driving phases are distinguished. The conventional scan line driving phase will also be referred to as pixel driving (PD) to distinguish it from another type of driving phase, referred to as common driving (CD). During a scan line or pixel driving phase the pixels are driven by a plurality of pixel driving voltages $V_{Eink\_PD}$. In contrast, during the common driving phase all pixels are driven with a common driving voltage that is uniform, i.e. the substantially equal for all pixels.

According to an aspect, in the common driving period the row driver 520 is controlled to provide row select voltages with a gate swing $\Delta V_{gate}$ that is lower during the common driving phase 666 than during the row scan line driving phase 630.

Referring to FIG. 4, this can be understood as follows. In general a transistor 510, e.g. a TFT, only functions properly, i.e. maintains a conducting or non-conducting state, when operated by gate voltages that are higher and lower than the voltages present at the source and drain terminals. When applying a pulse width modulation scheme, dependent on the transistor (e.g. semiconductor materials and doping), the gate switching voltages should also have a certain margin above and below the column and pixel voltages (e.g. +13V for non-conducting and −10V for conducting). In cases where the pixel voltages are also spread with different values (e.g., between +15 and −15V), the gate voltages have to operate between +15+13=+28V and −15−10=−25V for maintaining non-conducting and conducting states, respectively, for all pixels. Switching the gate from either a conducting to a non-conducting state or vice versa in this case requires a gate switching voltage swing $\Delta V_{gate}$=28+25=53V.

However, if the spread of pixel voltages is lower, for example when all pixels are driven with the same voltage during a common driving period, the gate voltages can be closer together. For example if all the pixel voltages $V_{px}$ are +15V, the gate switching voltages can be +15+13=28V and +15−10V=+5V. The gate switching voltage swing $\Delta V_{gate}$ would thus be 28−5=23V. This means that the gate switching voltage swing $\Delta V_{gate}$ can be lower during a common driving phase than during a pixel driving phase. This reduction of the voltage swing e.g. also reduces stresses on the TFTs and may conserve energy.

The display additionally comprises a common driver for providing a variable common voltage to the common terminals. This variable common voltage $V_{CE}$ can compensate for a change $\Delta V_{col}$ (e.g. lowering) of the column voltages $V_{col}$ and thereby a change of the pixel voltages $\Delta V_{px}$ while maintaining the same driving voltage differentials $V_{Eink}$. For example if all column voltages are +15V and the common voltage is normally 0V, the column voltages can be lowered to +7.5V if the common voltage is set to −7.5V. The driving voltage differentials $V_{Eink}=V_{CE}-V_{px}$ then remains −15V. By lowering the absolute voltages, e.g. stresses to the TFTs can be minimized.

Alternatively, during periods when all pixels experience the same driving voltage differentials $V_{Eink}$ the pixels can be driven entirely by the common voltage $V_{CE}$. For example, by setting the pixel voltage $V_{px}$ to 0V, and applying ±15V to the common terminals 102, the pixels all experience a common driving voltage differential $V_{Eink}=V_{CE}=\pm 15V$.

In the transition between a PD phase and a CD phase, typically a transition frame is needed to switch all pixels to the new phase. These transition frames at the beginning and end of the common driving phase may comprise sequentially scanned (row-by-row) transitions wherein all rows are switched sequentially to and from the common driving phase. These transition frames are referred to as the common driving initialization and ending frames and are part of the common driving phase.

Here pulse width modulation with different data voltages is examined. High voltage pixel driving (HVPD) allows driving of pixels to White and to Black simultaneously. During a full frame either +15V (to Black) or −15V (to White) is written on a pixel which requires a voltage swing of 30V on the columns.

Low voltage pixel driving (LVPD) reduces the voltage swing of the column voltages $V_{col}$ by applying a variable common voltage $V_{CE}$ to the common terminal 102 such that the driving voltage differential $V_{Eink}=V_{CE}-V_{col}$ remains the same. The price to pay is that during one frame it is now only possible to either switch a pixel to White ($V_{CE}$=+7.5V) or to switch a pixel to Black ($V_{CE}$=−7.5V). It is however possible to have a fast switch ($V_{col}$=7.5V, 15V over E Ink) and a slow switch ($V_{col}$=0V, 7.5V over E Ink), which helps realizing of more grey levels.

In FIG. 4, the common terminals 102 are connected to ground (0V) instead of a voltage source that provides $V_{CE}$. The transistors 310 may be TFTs, for example, which may be MOSFET transistors 310, as shown in FIG. 3, and are controlled to turn ON or OFF (i.e., switch between a conducting state 890, where current $I_d$ flows between the source S and drain D, and non-conducting state 892) by row select $V_{gate\_select}$ and non-select voltages $V_{gate\_non\text{-}select}$, respectively, applied to row electrodes 320 connected to their gates G, referred to as $V_{row}$ or $V_{gate}$. The sources S of the TFTs 310 are connected to column electrodes 330 where data or image voltage levels, also referred to as the column voltage $V_{col}$ are applied.

In this text, gate voltages for the TFTs or transistors 510 are shown as they are for a polymer electronics active-matrix back plane with p-type TFTs. In this case, the transistor is brought into a closed or non-conducting state 892 by applying a non-select voltage $V_{gate\_OFF}$ to the gate G which is higher than the voltages at the source S or drain D. The transistor is brought into an open or conducting state 890 by applying a select voltage $V_{gate\_ON}$ to the gate G which is lower than the voltages at the source S or drain D. It is noted that for n-type TFTs (e.g. amorphous silicon), the polarity of the gate voltages, compared to the source and/or drain voltages, would be opposite. It is understood that this difference does not change the working principle of the invention.

If the voltage difference between the gate G and source S or drain D is lowered, the transistor can still be in a conductive state 891 for column voltages that are kept at lowered predefined uniform voltage. This state 891 will be referred to as the common driving gate voltage state 891. The voltage applied to the gate to bring the transistor 510 in a common driving gate voltage state 891 will be referred to as common driving gate voltage $V_{gate\_CD}$. Lowering the gate voltages, e.g. from $V_{gate\_ON}$ to $V_{gate\_CD}$, can be advantageous e.g. if the select period is longer, for reducing stresses and conserving energy.

As shown in FIG. 3, various capacitive elements are connected to the drain of the TFT 310. First there is the pixel itself which is represented by a display effect capacitor $C_{DE}$ that contains the display effect also referred to as the pixel capacitor. In order to hold the charge or maintain the level of pixel voltage $V_{px}$ a storage capacitor $C_{st}$ may be provided between the TFT drain D and a storage capacitor line 340. Instead of the separate storage capacitor line 340, it is also possible to use the next or the previous row electrode as the storage capacitor line. Finally due to parasitic effects a gate-drain parasitic capacitor $C_{gd}$ between the TFT gate G and drain D is schematically shown in dashed lines in FIG. 3.

FIG. 5A shows a simplified circuit 500 similar to the active matrix pixel circuit 300 shown in FIG. 3, where the TFT 310 is represented by a switch 510 controlled by a signal from the row electrode 320, and the plurality of pixels 555 is represented by a pixel capacitor CDE connected between one end of the TFT switch 510 and the common terminal 102 with a pixel terminal 101 and a common terminal 102, respectively. The other end of the TFT switch 510 is connected to the column electrode 330.

The TFT 310 or switch 510 closes or conducts when a voltage, e.g., negative voltage, from the row electrode is applied to the TFT gate G resulting in the flow of current $I_d$ through the TFT 310 (or switch 510) between its source S and drain D. As current $I_d$ flows through the TFT, the storage capacitor $C_{st}$ is charged or discharged until the potential of pixel terminal 101 at the TFT drain D equals the potential of the column electrode, which is connected to the TFT source S. If the row electrode potential is changed, e.g., to a positive voltage, then the TFT 310 or switch 510 will close or become non-conductive, and the charge or voltage at the pixel terminal 101 will be maintained and held by the storage capacitor $C_{st}$. That is, the potential at the pixel terminal 101, referred to as the pixel voltage $V_{px}$ at the TFT drain D will be substantially constant at this moment as there is no current flowing through the TFT 310 or switch 510 in the open or non-conductive state.

The amount of charge on the storage capacitor $C_{st}$ provides or maintains a certain potential or voltage difference between the storage capacitor line 340 and pixel terminal 101 of the pixel capacitor $C_{DE}$. If the potential of the storage capacitor line 340 is increased by 5V, then the potential at the pixel terminal 101 will also increase by approximately 5V, assuming $\Delta V_{px} \approx \Delta V_{st}$ as will be described. This is because the amount of charge at both nodes of the storage capacitor $C_{st}$ is the same since the charges cannot go anywhere.

It should be understood that for simplicity, it is assumed that the change in the pixel voltage $\Delta V_{px}$ across the pixel $C_{DE}$ is approximately equal to the change in the storage capacitor voltage $\Delta V_{st}$ across the storage capacitor $C_{st}$, i.e., $\Delta V_{px} \approx \Delta V_{st}$. This approximation holds true particularly when $C_{st}$ is the dominant capacitor, which should be the case. A more exact relation between $V_{px}$ and $V_{st}$ is given by equation (1):

$$\Delta V_{px}=(\Delta V_{st})[(C_{st})/(C_{TOTAL})] \quad (1)$$

where $\Delta V_{px} \approx \Delta V_{st}$ when $C_{TOTAL} \approx C_{st}$ and thus $(C_{st})/(C_{TOTAL}) \approx 1$ The total pixel capacitance $C_{TOTAL}$ is defined as the sum of all capacitance, namely:

$$C_{TOTAL}=C_{st}+C_{DE}+C_{rest} \quad (2)$$

where $C_{rest}$ is the sum of all other capacitance (including parasitic capacitance) in the pixel.

The change in the pixel voltage $\Delta V_{px}$ (at pixel terminal 101 in FIG. 5A) can thus be expressed in terms of both the storage voltage swing $\Delta V_{st}$, i.e. the change in voltage across the storage capacitor $C_{st}$ and the common voltage swing $\Delta V_{CE}$, i.e. the change in voltage across the display effect capacitor $C_{DE}$, as shown in equation (3):

$$\Delta V_{px}=(\Delta V_{st})[(C_{st})/C_{TOTAL})]+(\Delta V_{CE})[(C_{DE})/C_{TOTAL})]. \quad (3)$$

It is desired not to affect the driving voltage differential $V_{Eink}$ and thus not to affect the displayed image when voltages are changed. Having no display effects or no pixel voltage change means that $\Delta V_{Eink}=0$.

Since $V_{Eink}=V_{CE}-V_{px}$ then:

$$\Delta V_{Eink}=\Delta V_{CE}-\Delta V_{px}=0 \quad (4)$$

Equation (4) indicates the desirable maintenance of the displayed image with substantially no changes in display effects when voltages are changed. That is, the change in the driving voltage differential $\Delta V_{Eink}$ is desired to be zero so that black or white states are maintained without any substantial change, for example.

Substituting $\Delta V_{px}$ from equation (3) into equation (4) yields:

$$\Delta V_{st}=(C_{TOTAL}/C_{st})[1-(C_{DE}/C_{TOTAL})]*(\Delta V_{CE}) \quad (5)$$

Thus, when the common voltage is changed by an amount $\Delta V_{CE}$, then it is desired to change the voltage on the storage line by $\Delta V_{st}$ that satisfies equation (5).

As seen from equation (5), in order to prevent any voltage change $\Delta V_{Eink}$ across the pixel $C_{DE}$, i.e. to ensure that $\Delta V_{Eink}=0$, and thus substantially maintain the same driving voltage differential $V_{Eink}$, the storage voltage $V_{st}$ are switched at substantially the same time as the common voltage $V_{CE}$ and with a storage voltage swing $\Delta V_{st}$ that is proportional to a common voltage swing $\Delta V_{CE}$, according to equation (5)

It should be noted that the storage capacitor $C_{st}$ in an active-matrix circuit designed to drive the E-ink (or pixel/display effect capacitor $C_{DE}$) is 20 to 60 times as large as the display effect capacitor $C_{DE}$. Typically, the value of the display effect capacitor $C_{DE}$ is small due to the large cell gap of the E-ink. The E-ink material exhibits a relatively large leakage current. The leakage current is due to a resistor in parallel with the display effect capacitor $C_{DE}$. The small value of the display effect capacitor $C_{DE}$ coupled with the leakage current require a relatively large storage capacitor $C_{st}$.

The various electrodes may be connected to voltage supply sources and/or drivers which may be controlled by a controller 515 that controls the various voltage supply sources and/or drivers, shown as reference numerals 520, 530, 570, connected to the row electrode 320, the column electrode 330, and the common terminal 102, respectively. The controller 515 is adapted to drive the various display electrodes or lines, e.g., pixel cell shown in the equivalent circuit 500, with pulses having different voltage levels that distinguish a control sequence of a scan line driving phase 630 and a common driving phase 666 as will be described further in with reference to FIGS. 6 and 8.

To realize the proper amount and timing of changes of the voltages of the storage capacitor voltage $V_{st}$ and common voltage $V_{CE}$, the common terminal 102 driver 570 may be connected to the storage capacitor line 340 through a storage capacitor line 340 through a storage driver 580 which may be programmable or controllable by the controller 515. In this case the storage driver 580 is a scaler which generates an output signal $V_{st}$ that is proportional (according to equation (5)) to the common voltage $V_{CE}$. In other words, the voltage $V_{st}$ of the output signal varies proportionally, preferably linearly proportionally with the common voltage $V_{CE}$. Alternatively the storage driver 580 may be a driver separate from controller 515. In this case the connection between the common terminal 102 driver 570 and the storage driver 580 is superfluous. The controller 515 may be configured to change the storage and common voltages $V_{st}$, $V_{CE}$ at substantially the same time and control the storage driver 580 such that the storage and common voltage changes correspond, e.g. satisfy the relationship shown by in equation (5), for example.

Figure 8:
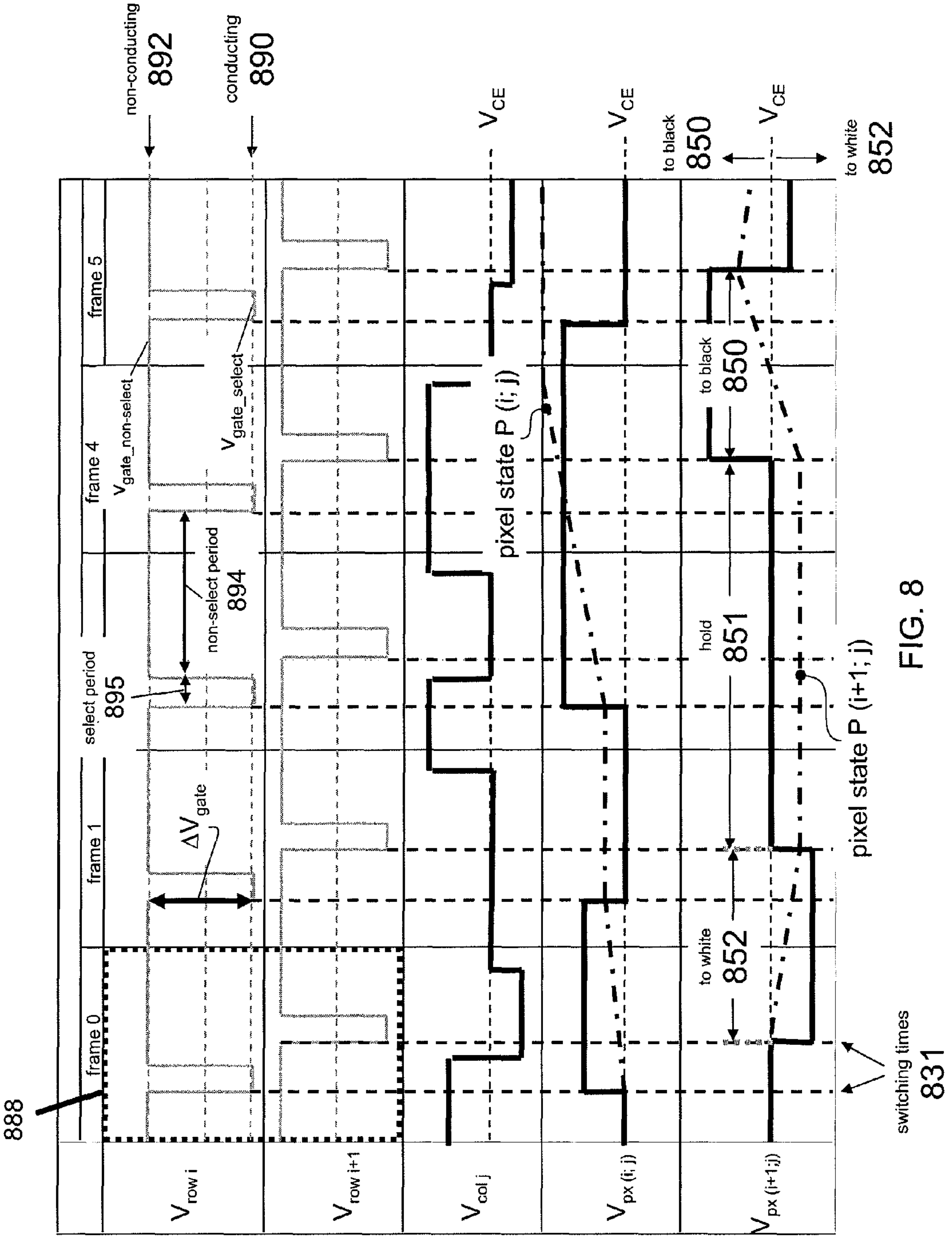
FIG. 8 shows voltage traces for driving different pixel states.

FIG. 8 shows a schematic graph of voltage levels during a number of scan periods 888. Active matrix driving is done by scanning all rows during a frame. The frame time is divided in n equal line times, where n is the number of rows in the display (for clarity only two rows i and i+1 are shown in FIG. 8). In a row selection sequence or scan period 888, starting with row 1 and ending with row n, each row is selected and the transistors (e.g. TFTs) are sequentially switched open with a gate switching voltage swing $\Delta V_{gate}$. During this gate switching voltage swing $\Delta V_{gate}$ the gate voltage $V_{gate}=V_{row}$ changes from a closed state voltage $V_{gate\_OFF}$ to an open state voltage $V_{gate\_ON}$ or $V_{gate\_CD}$ or vice versa.

Figure 8A:
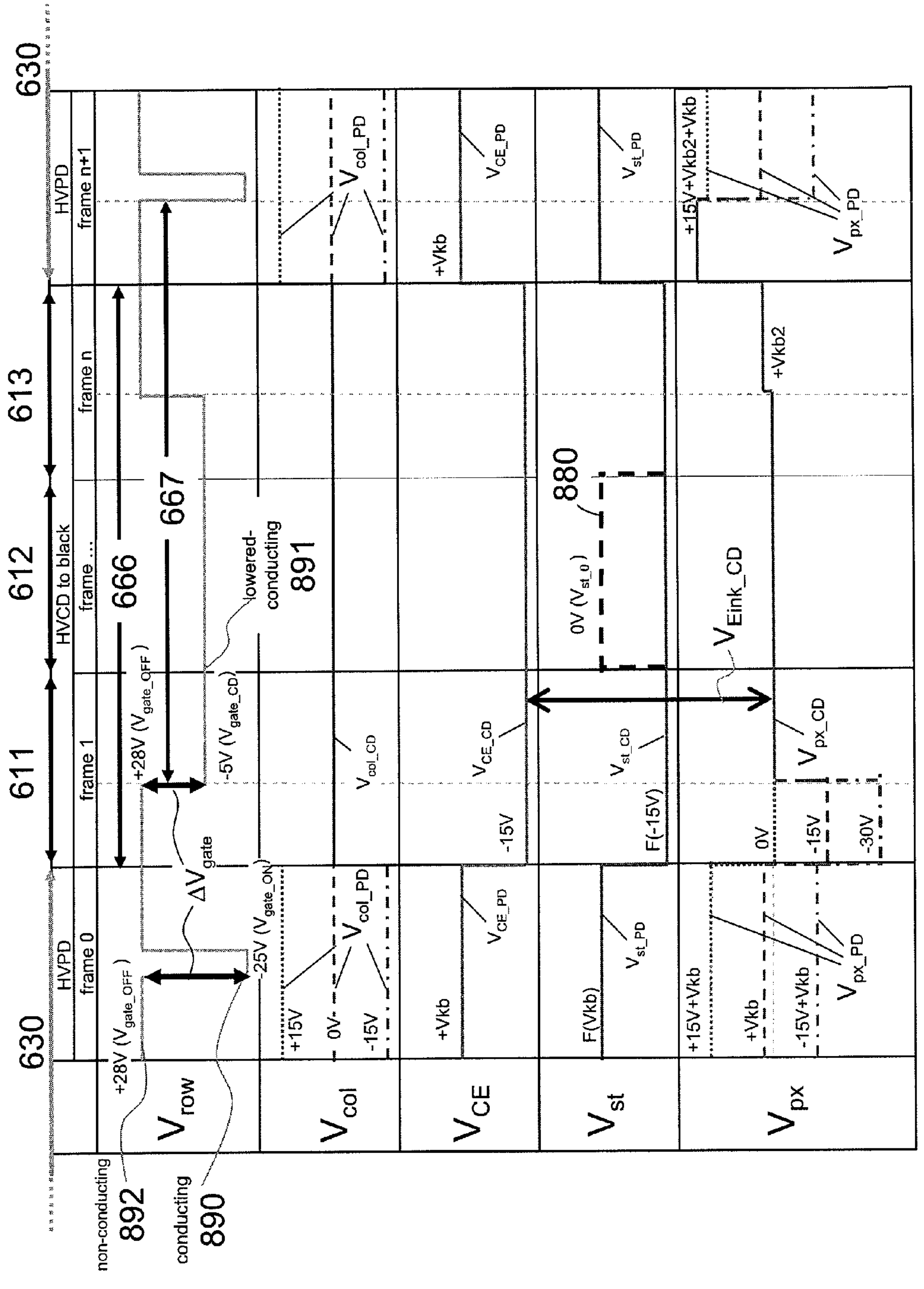
FIG. 8A shows voltage traces of HVPD and HVCD to Black.

By this switching of the voltages the gate is brought, for example, from a non-conducting state 892 to a conducting state 890 or common driving gate voltage state 891 (see, FIG. 8A). The gate is kept open during a select period 894 when the data $V_{col}$ that was written on the columns is transferred to the pixel ($V_{px}$). In this select period 894 the pixel capacitance is charged. The storage capacitor $C_{st}$, a capacitor between the pixel and a separate grid of storage lines, is the main constituent of the pixel capacitance. During the hold time or non-select period 894, the time that the switch TFT is closed, the written data voltage should remain on the pixel. The main leakage path of charge from the pixel is through the electrophoretic display effect, modeled in FIG. 3 by a parallel resistor 350 with leakage current $I_{leak}$.

The driving voltage differential $V_{Eink}$ between the common plate and the pixel plate drives the electrophoretic display effect and causes changes to the pixel state P, e.g. a change in grey level or a change from white to black. Note that the axis of black and white in FIG. 8 is reversed from If $V_{Eink}$ is 0V ($V_{px}=V_{CE}$) the current pixel state P is maintained. If the pixel voltage is higher than the common voltage, the pixel state P is driven to Black, if it is lower, the pixel state is driven to White (for the current examples).

The driving scheme of FIG. 8 illustrates that the same column electrode can be used to provide voltages for the pixels of multiple rows, by sequentially applying different column voltages $V_{col}$ to the column electrodes and opening the transistors at the switching times 831 when the appropriate data (voltage) is available on the electrode, while keeping the transistors 510 of the other rows closed. Alternatively, if the same data is to be written to all rows, such as during a common driving period, the transistors can be left in a common driving gate voltage state 891, in which state the conduction may be lower than during a regular conducting state 890. However, because after selection of the corresponding row the transfer of voltage is no longer limited to a short select period 894, this lower conductance is sufficient for transferring and/or maintaining the column voltages $V_{col}$ to the pixel terminals 101.

During a hold or non-select period 894 shown in FIG. 8, the row voltage $V_{row}$ is high (e.g., +28V), thus turning OFF the TFT 310 (non-conducting state, i.e., switch 510 is open). During a select portion 895 of the frame 610 where the TFT 310 is conducting (i.e., switch 510 is closed and the selected row is addressed), the pixel capacitors $C_{DE}$ shown in FIG. 5A (i.e., the total capacitance at the drain side of the TFT 310 or switch 510) of the selected row are charged to the voltage supplied on the column electrodes 330. During the remaining frame time 894 (i.e. the hold time), the current row is not addressed but the other rows are addressed sequentially. During the hold period 894, the TFTs are in their non-conducting state and the charge on the pixel capacitors is retained, for example, by the charges stored in the storage capacitor $C_{st}$ (FIGS. 3 and 5A).

To increase grey level accuracy and grey level distribution, additional effective pixel voltage levels $V_{Eink}$ across the pixel capacitor $C_{DE}$ are provided without the need for expensive column driver integrated ICs with more voltage levels, where existing voltage drivers and levels are used in various combinations to provide additional display effect voltage levels $V_{Eink}$, for example, under the control of the controller 515 shown in FIG. 5A. In particular, the common voltage $V_{CE}$ is changed to provide different display effect voltages $V_{Eink}$ across the pixel $C_{DE}$.

A further drive scheme embodiment is related to the timing of switching the voltage on the common terminal 102, i.e., timing of switching or changing $V_{CE}$. In particular, preferably the switch of the $V_{CE}$ and the $V_{st}$ does not result in one or more pixels being charged to an incorrect voltage (i.e., a voltage other than the column voltage). If a row is selected, the selected row will have a different behavior as compared to all other non-selected rows. After the common terminal 102 is switched or changed, the voltage over the pixels will change. This will lead to image artifacts as well. To avoid such image artifacts, the common voltage $V_{CE}$ is changed when all rows are non-selected. In other words, the gate voltage ($V_{gate}$ or $V_{row}$) of all the rows should be kept high (i.e., non-selected-TFTs non-conducting) while changing the common voltage. The column voltage $V_{col}$ is irrelevant at this moment because all TFTs are switched off (i.e., non-conducting).

The proper timing of voltage changes may be achieved in the configuration with a separate storage capacitor line 340 (shown in FIGS. 3 and 5), by changing the storage capacitor voltage, by for example using a storage voltage driver 580, at substantially the same time and with a voltage swing proportional to the voltage swing of the common terminal 102, according to equation (5). The voltage $V_{Eink}$ across the pixel $C_{DE}$ will keep substantially the same value when both the storage capacitor line 340 and the common terminal 102 are switched at substantially the same time.

Artifacts may result in the displayed image if the storage and common voltages $V_{st}$, $V_{CE}$ are not switched at substantially the same time. Further, as shown in FIG. 8A, the storage and common voltages $V_{st}$, $V_{CE}$ are switched at substantially the same time at the start and/or end of any scan period 888. In particular, preferably the switch of the $V_{CE}$ and the $V_{st}$ does not result in one or more pixels being charged to an incorrect voltage (i.e., a voltage other than the column voltage). In particular, FIG. 8A shows row or gate voltages, where a low level $V_{gate\_ON}$, for example, selects a row or turns ON the TFT 510 (conductive state, switch closed), and a high level $V_{gate\_OFF}$ turns OFF the TFT 510 (non-conductive state, switch open), and an intermediate level $V_{gate\_CD}$ switches the TFT 510 with a common driving gate voltage 891.

The controller 515 may be any type of controller and/or processor which is configured to perform operation acts in accordance with the present systems, displays and methods, such as to control the various voltage supply sources and/or drivers 520, 530, 570 to drive the display 500 with pulses having different voltage levels and timing as will be described. A memory 517 may be part of or operationally coupled to the controller/processor 515.

The memory 517 may be any suitable type of memory where data are stored, (e.g., RAM, ROM, removable memory, CD-ROM, hard drives, DVD, floppy disks or memory cards) or may be a transmission medium or accessible through a network (e.g., a network comprising fiber-optics, the world-wide web, cables, or a wireless channel using time-division multiple access, code-division multiple access, or other radio-frequency channel). Any medium known or developed that can store (non-transitory) and/or transmit (transitory) information suitable for use with a computer system may be used as the computer-readable medium and/or memory. The memory 517 or a further memory may also store application data as well as other desired data accessible by the controller/processor 515 for configuring it to perform operation acts in accordance with the present systems, displays and methods.

Additional memories may also be used. The computer-readable medium 517 and/or any other memories may be long-term, short-term, or a combination of long-term and short-term memories. These memories configure the processor 515 to implement the methods, operational acts, and functions disclosed herein. The memories may be distributed or local and the processor 515, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within the memory 517, for instance, because the processor 515 may retrieve the information from the network for operation in accordance with the present system.

The processor 515 is capable of providing control signals to control the voltage supply sources and/or drivers 520, 530, 570 to drive the display 500, and/or performing operations in accordance with the various addressing drive schemes to be described. The processor 515 may be an application-specific or general-use integrated circuit(s). Further, the processor 515 may be a dedicated processor for performing in accordance with the present system or may be a general-purpose processor wherein only one of many functions operates for performing in accordance with the present system. The processor 515 may operate utilizing a program portion, multiple program segments, or may be a hardware device, such as a decoder, demodulator, or a renderer such as TV, DVD player/recorder, personal digital assistant (PDA), mobile phone, etc, utilizing a dedicated or multi-purpose integrated circuit(s).

Any type of processor may be used such as dedicated or shared one. The processor may include micro-processors, central processing units (CPUs), digital signal processors (DSPs), ASICs, or any other processor(s) or controller(s) such as digital optical devices, or analog electrical circuits that perform the same functions, and employ electronic techniques and architecture. The processor is typically under software control for example, and has or communicates with memory that stores the software and other data such as user preferences.

Clearly the controller/processor 515, the memory 517, and the display 500 may all or partly be a portion of single (fully or partially) integrated unit such as any device having a display, such as flexible, rollable, and wrappable display devices, telephones, electrophoretic displays, other devices with displays including a PDA, a television, computer system, or other electronic devices. Further, instead of being integrated in a single device, the processor may be distributed between one electronic device or housing and an attachable display device having a matrix of pixel cells 500. In particular, memory 517 functions as storage medium for storing lookup table (LUT) storing scan line driving values for controlling the column driver, during the scan line driving phase 630 and during a sequential scan line driving phase 631. In addition a common driving flag is set in accordance with the look up table (LUT) to indicate the status of the common driving period 666 and wherein the controller 515 comprises switching circuitry to switch from the scan line driving phase 630 to the common driving phase 666 as a result of the common driving flag in the look up table.

Figure 5B:
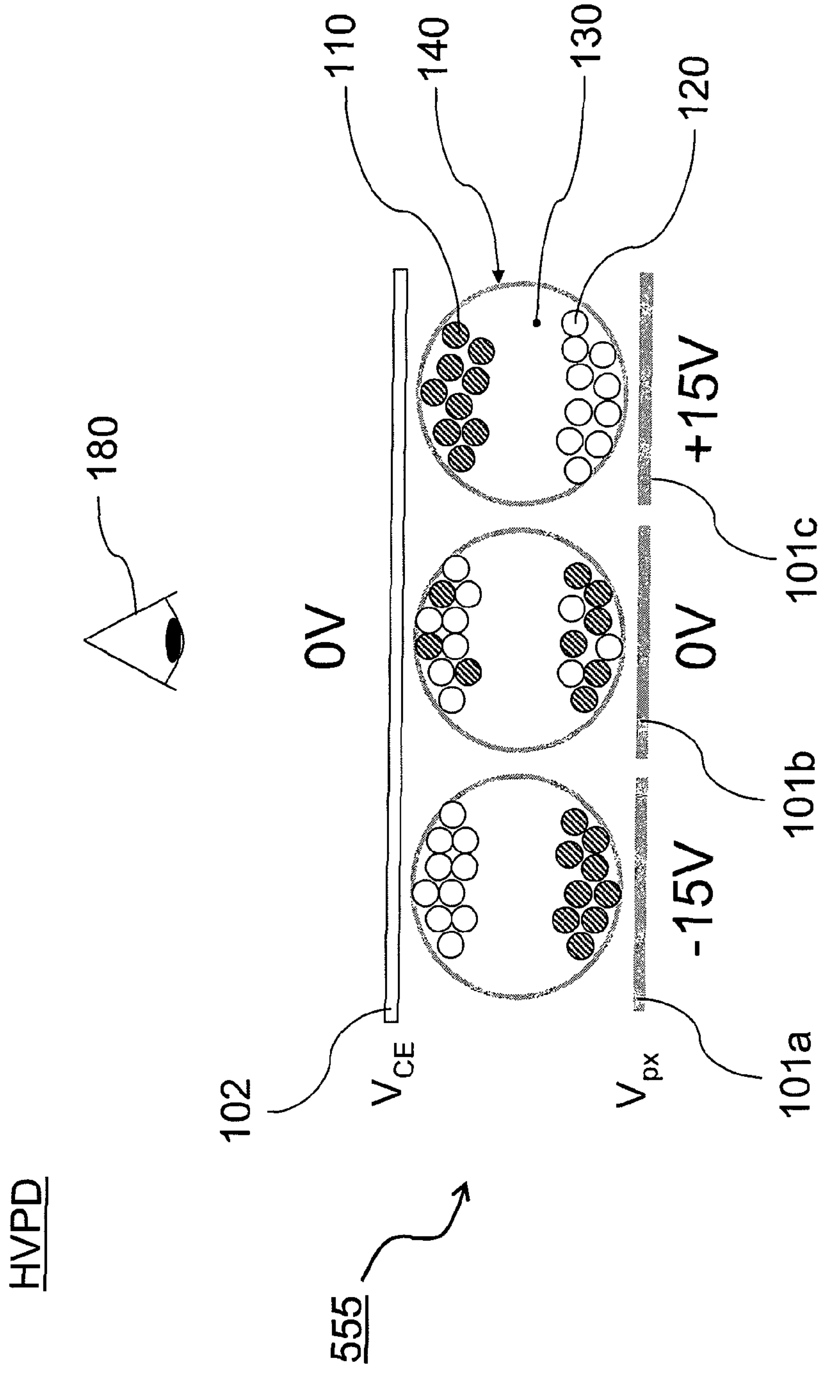
FIG. 5B shows part of the circuit of 5A configured for HVPD (high voltage pixel driving)

FIG. 5B shows a plurality of pixels 555 where three different modes of high voltage pixel driving (HVPD) are applied. In the left pixel a relatively high negative voltage, e.g. −15V, is applied to the pixel terminal 101*a* by the column driver, while 0V is applied at the common terminal 102 by the common driver. The electric fields, resulting from this voltage differential, cause the black particles in this pixel to drift towards the pixel terminal 101*a* while the white particles drift towards common terminal. Because the common terminal is on the viewing side, this pixel is driven to White.

In the right pixel a relatively high positive voltage, e.g., +15V, is applied to the pixel terminal 101*c*, while the common terminal 102 is still at 0V. This voltage differential causes an electric field in the pixel that is opposite in direction from the previously mentioned pixel, which results in pixel driving to Black.

In the middle pixel a voltage of 0V is applied at the pixel terminal 101*b*, i.e. equal to the common voltage $V_{CE}$. This results in the fact that this pixel is not driven but holds its current pixel state P, which in this case means that it remains grey.

Figure 5C:
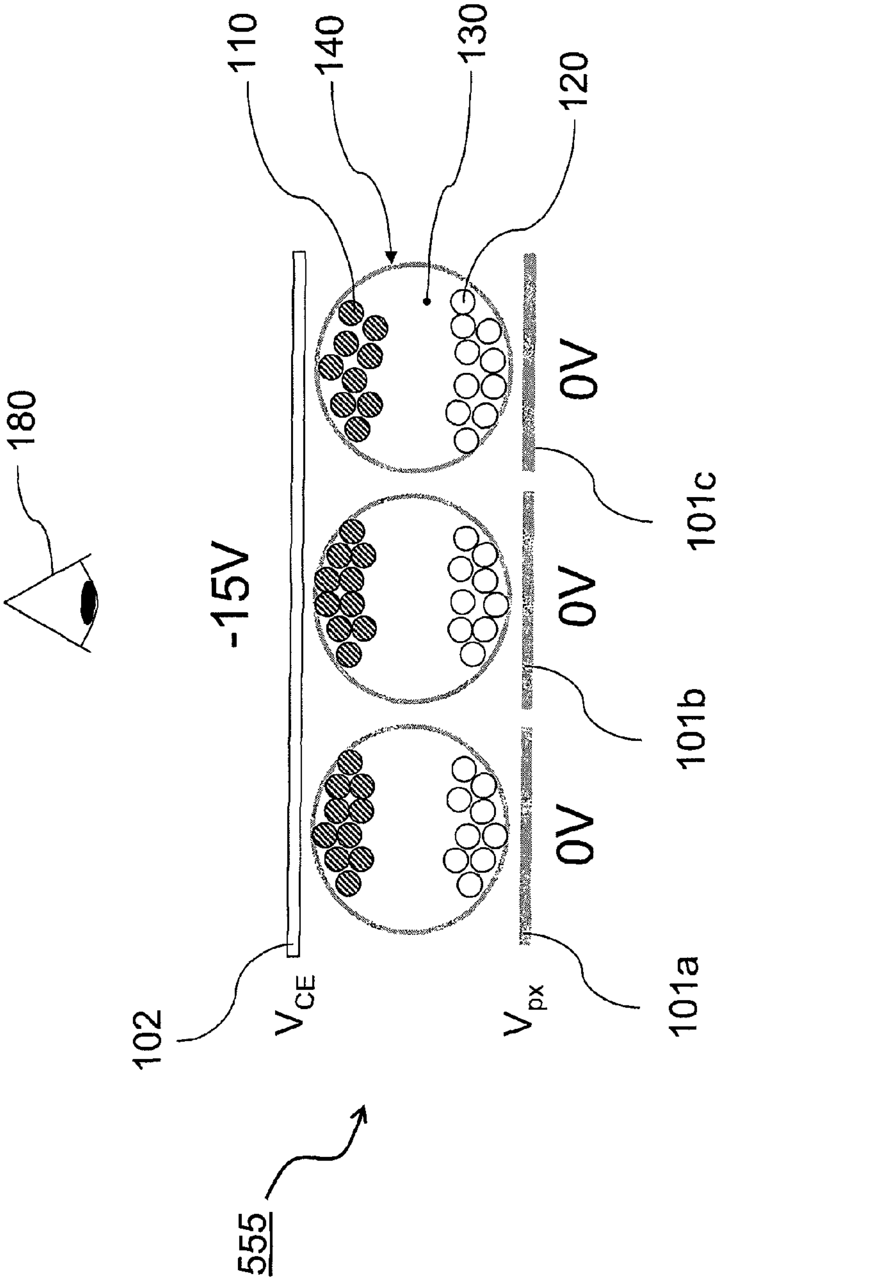
FIG. 5C shows part of the circuit of 5A configured for HVCD (high voltage common driving) to Black.

FIG. 5C shows a plurality of pixels 555 where high voltage common driving (HVCD) to Black is applied. For all pixels a relatively high negative voltage $V_{CE}$ is applied to the common terminal 102 while the pixel voltages $V_{px}$ applied at the pixel terminals 101*a*, 101*b*, 101*c*, are all kept at 0V. This causes all pixels to be driven to Black.

It is noted that it is not necessary for all pixel voltages to be equal for the pixels to be driven to Black, merely that they be higher than the common voltage. However, the rate at which the pixels are driven is affected by the magnitude of the voltage difference as shown in FIG. 2B. HVCD to White is similarly achieved reversing the polarity of the voltage at the common terminal 102.

Figure 5D:
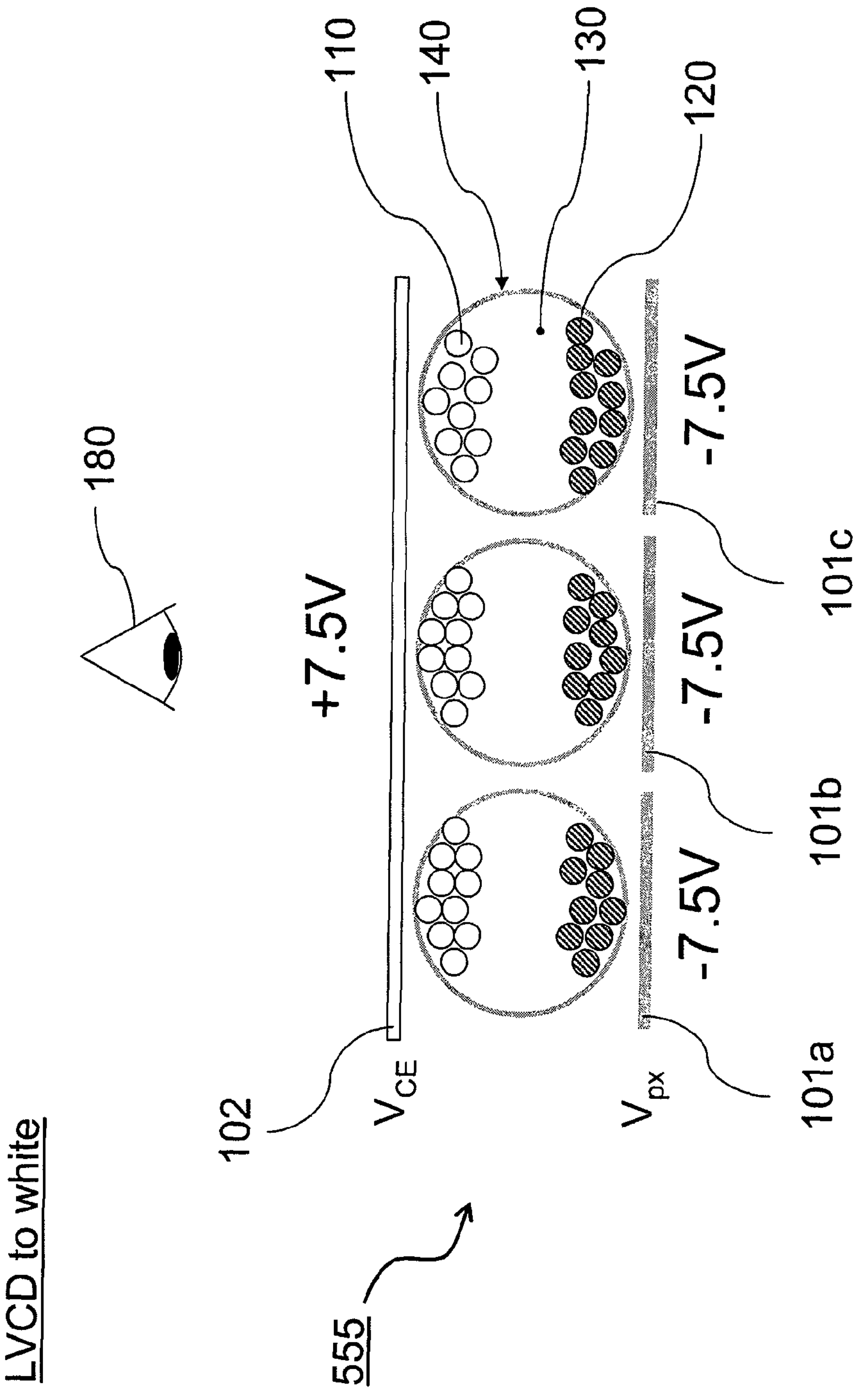
FIG. 5D shows part of the circuit of 5A configured for LVCD (low voltage common driving) to White.

FIG. 5D shows a plurality of pixels 555 where low voltage common driving (LVCD) to White is applied. With LVCD the voltages at the common terminal 102 are lowered (in an absolute sense, closer to 0V) and this is compensated by applying a voltage at the pixel terminal. An advantage of this scheme is that the absolute voltages can be kept low while still achieving a large voltage difference, resulting in a relatively fast pixel driving rate.

If the TFTs 510 are closed (non-conductive) during a driving period, there can be a slight voltage decay at the pixel terminal 101 due to leakage current $I_{leak}$ (see FIG. 3). To maintain a steady voltage level on the pixel terminals 101*a*, 101*b*, 101*c* it is therefore advantageous to keep the TFT 510 in at least a conducting common driving gate select voltage state 891 during a common driving period with a gate swing ($\Delta V_{gate}$) that is lower during the common driving phase 666 than during the row scan line driving phase 630. This is possible because during a common driving period the pixel voltages can be equal so the TFTs do not have to switch. This allows the column voltages to be applied during the whole common driving period. Therefore, during common driving there will not be a drop in pixel voltage due to leakage through the electrophoretic display effect during the hold time, as there is no hold time. Also common driving is typically insensitive for non-uniformities in the backplane (e.g. TFT on-current or TFT off-current) and in the frontplane (e.g. cell gap resistance). This implies that common driving is inherently faster, more uniform and less sensitive to image history.

Figure 6A:
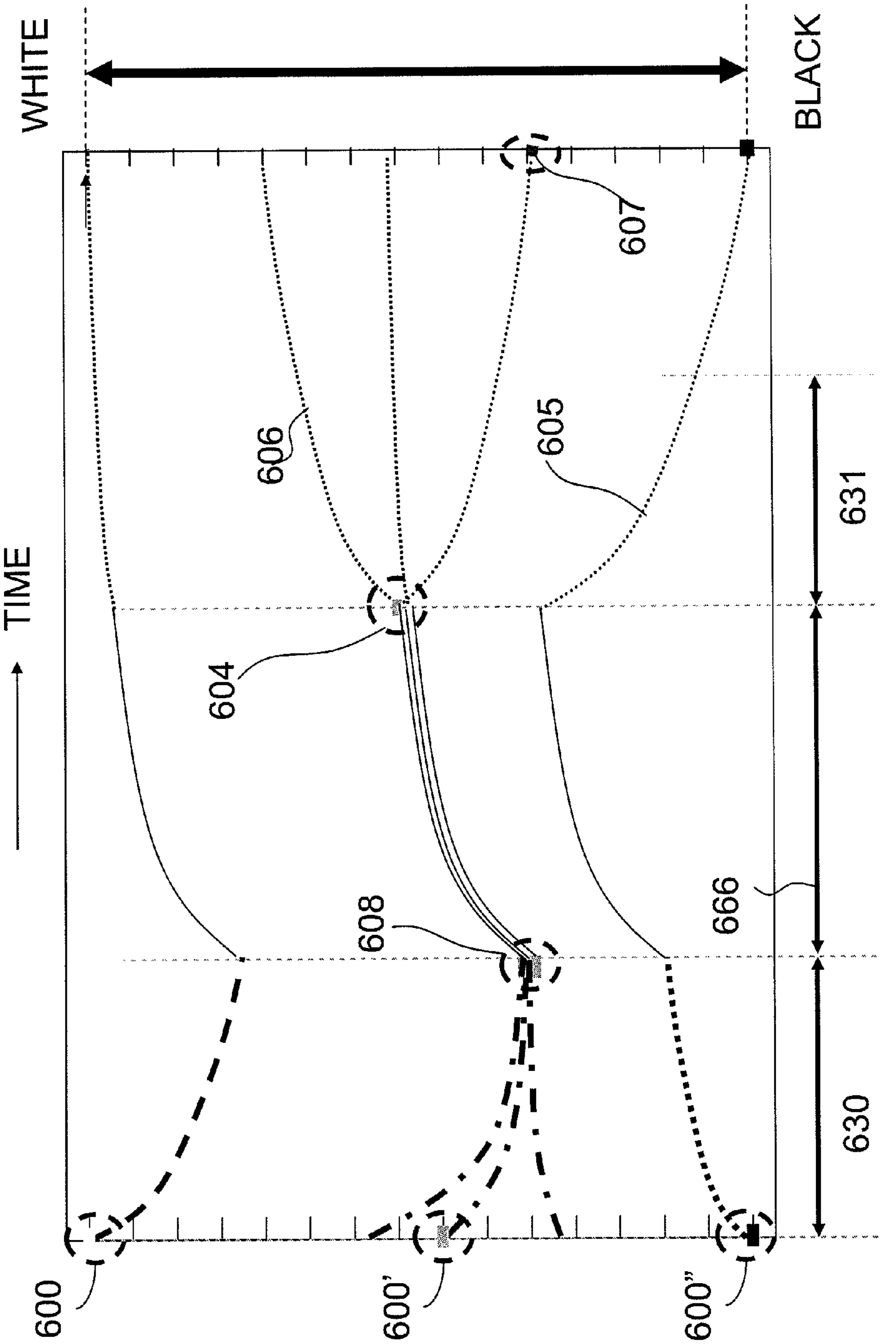
FIG. 6A shows the time development of pixel states with a common driving period.

FIG. 6A shows a schematic graph of an example time dependent state of a pixel for a series of applied voltage periods. In this example, pixels start from initial pixel states 600 to final pixel states 607. Three pixels are first brought by a scan line driving phase, to initial common state 608 In some embodiments, the initial common state 608 may be tuned respective to a corresponding original pixel state 600—so that each pixel 600 is set to an initial common state 608 that is similar but not necessarily equal for differing original pixel states 600. This phase is followed by a common driving period 666 where a negative voltage $V_{CE\_CD}$ is applied to the common terminal 102, until all pixels are commonly driven to a final common state 604, which in this case is a specific grey level. In an embodiment, for each pixel a respective initial common pixel state is adjusted as a function of the initial pixel state, resulting in mutually differing initial common pixel states for each pixel. In another embodiment, the final common states may differ, but are preferably at least groupwise identical to erase history effects of the pixels. Schematically are indicated pixel sets 600, 600', and 600".

After the common driving period, there are two possibilities for each individual pixel. Pixel driving to White 606 can be applied to increase the white pigmentation or pixel driving to Black 605 can be applied to increase the black pigmentation. In this example pixel driving to Black 605 is applied to reach a final pixel state 607 for a specific pixel.

An advantage of the common driving scheme is that the final pigmentation of the pixels is less dependent on non-uniformities in the TFTs or pixels (e.g. leakage currents). Because the TFTs can be kept in a conducting state 890 or common driving gate voltage state 891, the voltages on the pixel terminals can be maintained. This leads to a steady voltage differential for all pixels during the common driving period(s) resulting in a more uniform and reliable image update. FIG. 6A further illustrates that for longer pixel driving times there may develop a spread in the destination pigmentation e.g. due to non-uniformities in the TFTs or leakage currents through the pixels.

Figure 6B:
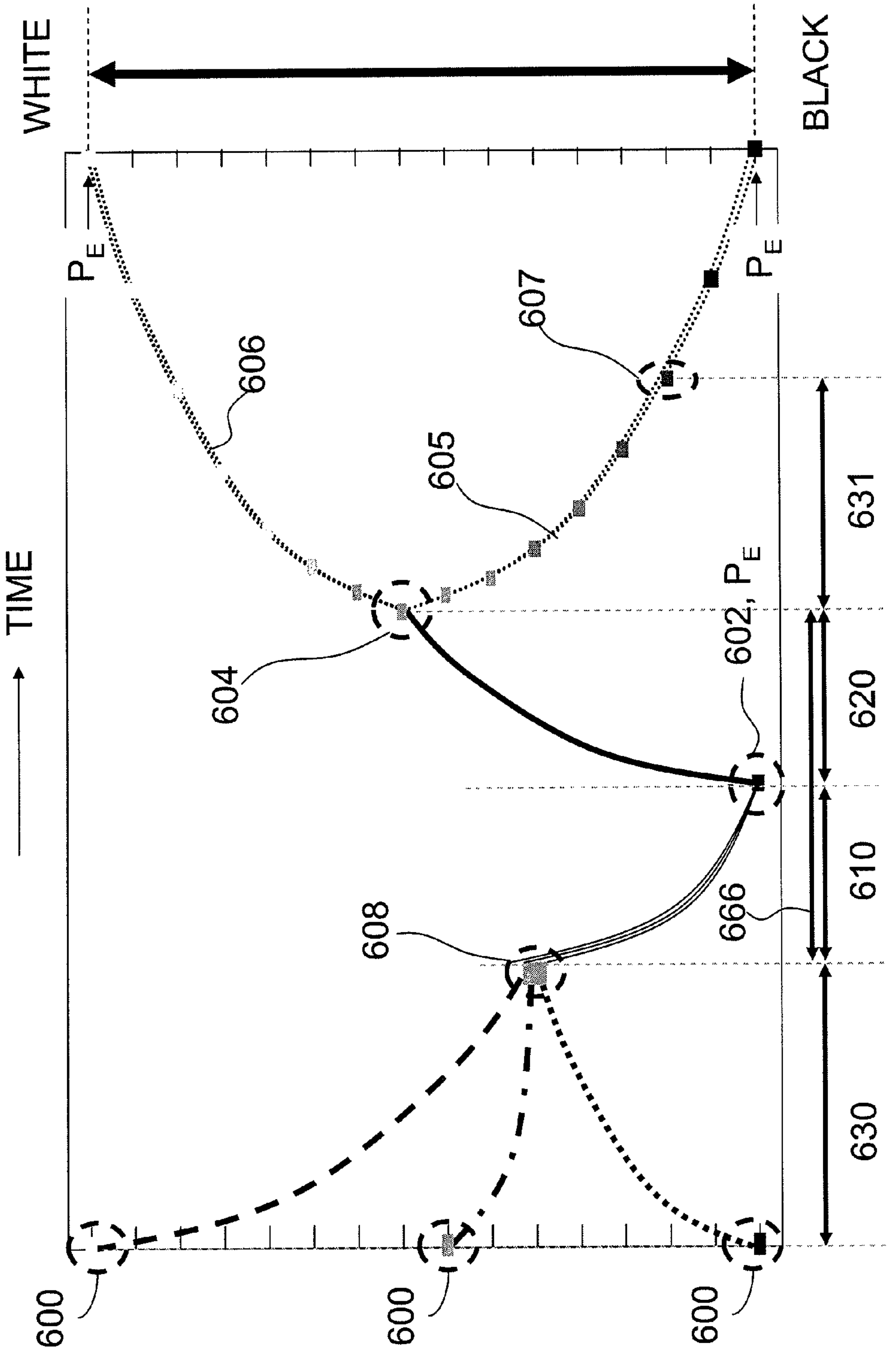
FIG. 6B shows the time development of pixel states in a graph with a two common driving periods.

FIG. 6B shows a graph similar to FIG. 6A, but now comprising an intermediate common driving period 610 to an intermediate common state 602 followed by a final common driving phase 620 towards final common state 604. The intermediate common state 602 is a black pixel state for increasing the uniformity of pixel states P. Alternatively the intermediate common state 602 could also have been a white pixel state.

After all pixels have reached the intermediate common state 602 (in this case an extreme black state), a pixel driving phase 631 follows where the common voltage is reset to a nominal (pixel driving) value $V_{CE\_PD}$ and each pixel can be driven individually through pixel driving to White 606 to a specific destination pixel state 607, anywhere on the scale between black and white, where the pigmentation depends now only on the hold time of the pixel driving phase 630 and no longer on the initial pixel state 600.

This driving scheme thus significantly reduces the complexity of the LUT. For example if there are N grey scales, the lookup table has simplified from having N×N entries to just N+N entries: there are N ways to go from the initial pixel states 600 to the initial common state 608 plus N ways to go from the final common state 604 towards a plurality of pixel states P.

It is a further advantage of the common driving scheme that it is possible to set the storage voltage $V_{st}$ to a lower absolute voltage level $V_{st\_0}$ (e.g. 0V) during at least part of the common driving phase 612, e.g. frame 2 to frame n−1 of the common driving period, as long as it is switched back to the correct value a number of line times before the start of frame n. This changing of the storage voltage does not affect the driving voltage differential $V_{Eink}$ because the transistors 510 are open and the pixel voltages $V_{px}$ remain linked to the column voltages $V_{col}$. This lowering of the storage voltage can be attractive to reduce power and stress over storage-column crossings.

Figure 7A:
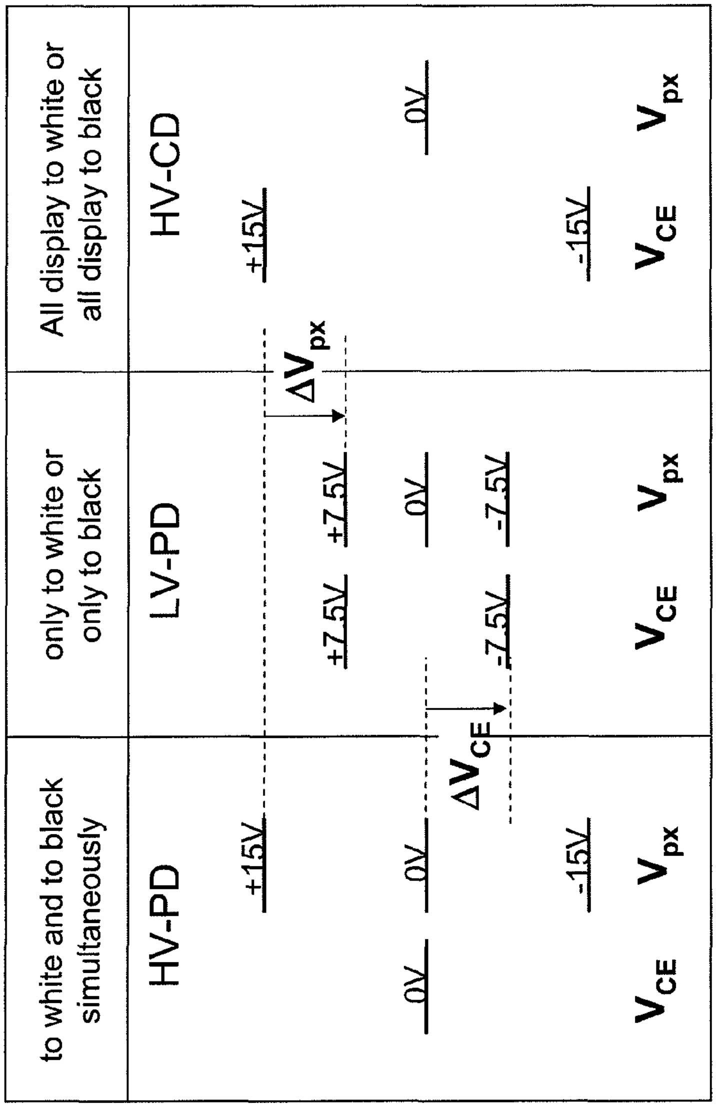
FIG. 7A shows voltage levels used for different driving modes: HVPD, LVPD (low voltage pixel driving), and HVCD.

FIG. 7A shows three different modes of display driving: High voltage pixel driving (HVPD), low voltage pixel driving (LVPD), and high voltage common driving (HVCD).

Using HVPD, different pixels can be driven simultaneously to White ($V_{px}$=−15V) and to Black ($V_{px}$=+15V). In general, maintaining higher voltages costs more energy and higher voltage differences can lead to a shorter lifetime of the display, for example, due to stresses on the TFTs.

Using LVPD partly remedies this problem by providing a variable common voltage $V_{CE}$ to the common terminals 102. This variable common voltage can maintain the same driving voltage differentials $V_{Eink}=V_{CE}-V_{px}$ while changing the pixel voltages $\Delta V_{px}$ to a lower (absolute) value by compensating for this change $\Delta V_{px}$ by a corresponding change $\Delta V_{CE}$ in the common voltage $V_{CE}$. Similarly this allows a column voltage differential change $\Delta V_{col}$ of the column voltages $V_{col}$.

Alternatively, the column driver 530 and/or the common driver 570 can be configured to decrease an image update time by increasing the driving voltage differential $V_{Eink}$, for example, by decreasing a negative common voltage when the pixel voltages are positive, or vice versa.

With LVPD it is possible to drive some pixels to White (e.g. $V_{CE}$=+7.5V and $V_{px}$=−7.5V) while holding the pigmentation on other pixels (e.g. $V_{px}=V_{CE}$=+7.5V). Equivalently it is also possible to drive some pixels to Black while holding others by reversing the polarity of the voltages. It is, however, not possible with this scheme to simultaneously drive some pixels to Black and others to White. An added possibility with LVPD is that it is possible to drive some pixels to Black or white with half the driving voltage, e.g. $V_{CE}$=+7.5V and $V_{px}$=0. This leads to a slower driving rate as shown in FIG. 2A, but could be useful for those pixels that are already close to their destination state.

Using HVCD and common driving in general, it is only possible to drive all pixels to White or all pixels to Black. This is particularly useful when the full screen needs an image update. In such a screen update, for example, the display will first turn black before an image is formed. HVCD has an advantage that the TFT can be kept in a conducting state 890 or semiconducting state 891, thus maintaining the pixel voltage $V_{px}$ resulting in a more uniform and reliable image update.

During the common driving period the current from the TFT has as a main purpose to compensate for the small leakage currents $I_{leak}$ through the pixel. This means that a reduced conductance of the TFT can be sufficient. An advantage of the common driving gate voltage state 891 is that the voltage on the gate G can be kept lower than in the fully conductive state thus lowering the stresses on the TFT due to voltage differences between $V_{row}$ (gate G) and $V_{col}$ (source S). By maintaining at least a semi-conductive state 891 the uniform common driving column voltage $V_{col\_CD}$ can be maintained on the pixel terminals 601.

Figure 7B:
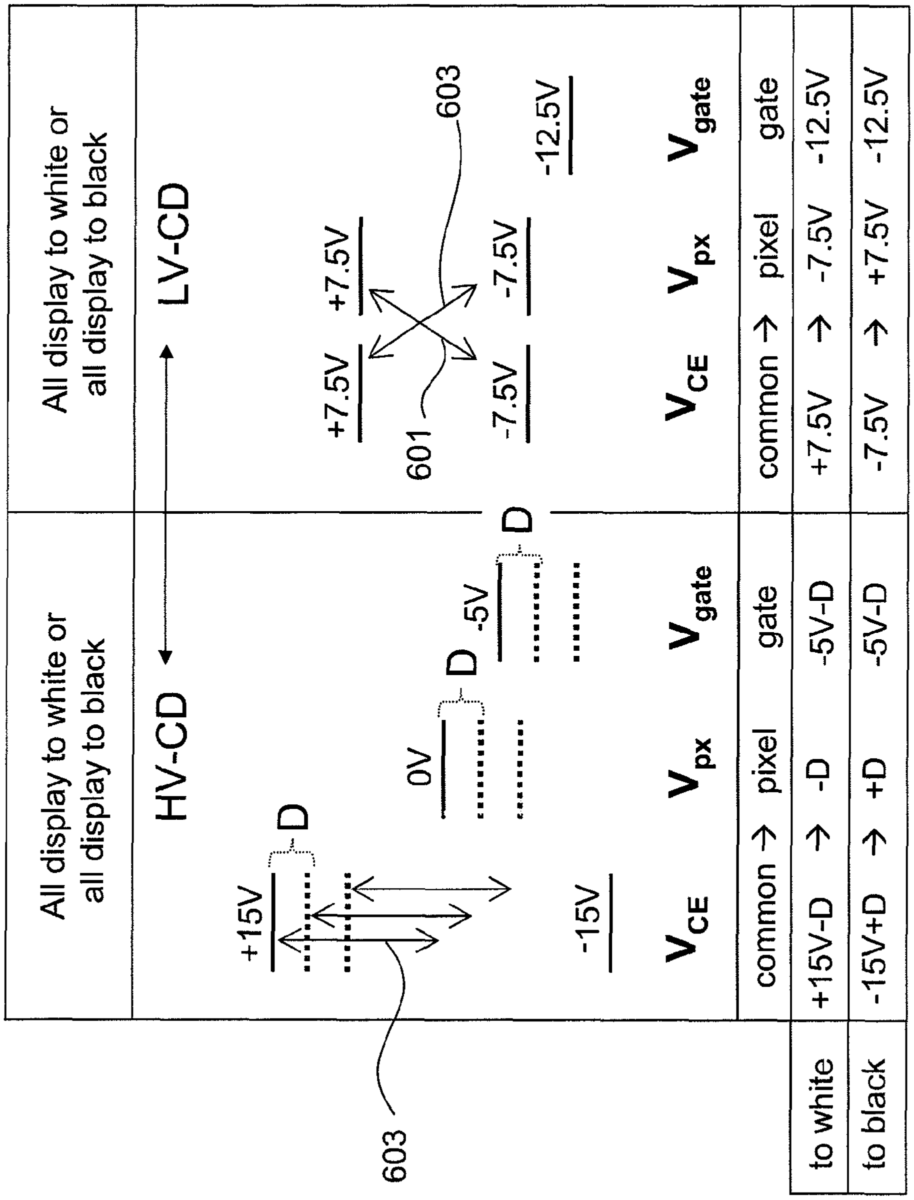
FIG. 7B shows voltage levels for the sliding scale of driving modes between HVCD and LVCD.

FIG. 7B shows two embodiments of the common driving method which are related to each other by a sliding scale D. On the one hand there is HVCD where common voltages of +15V or −15V are used to drive all pixels to White or Black, respectively, while the pixel voltages are kept at 0V. On the other hand there is low voltage common driving (LVCD) where the common voltages are either +7.5V or −7.5V while the corresponding pixel voltages are −7.5V or +7.5V, respectively. As long as the voltage difference $V_{Eink}=V_{CE}-V_{px}=+15V$ the pixels are driven to White and for $V_{Eink}=-15V$ the pixels are driven to Black. In both cases all column voltages are the same and so the TFT can be left in a conducting state 591 to maintain these voltages on the pixel terminals 101.

HVCD, LVCD and all intermediate variants can be described by the following settings for the applied voltages:

$$V_{CE}=+15V-D;\ V_{st}=F(V_{CE});\ V_{px}=0V-D;\ V_{row}=V_{gate}=-5V-D$$

(CD to White)

$$V_{CE}=-15V+D;\ V_{st}=F(V_{CE});\ V_{px}=0V+D;\ V_{row}=V_{gate}=-5V-D$$

(CD to Black)

For D=0 HVCD is obtained and for D=+7.5 LVCD is obtained.

For implementing this rescaling of the voltage, a common driver 570 can be used for providing a variable common voltage $V_{CE}$ to the common terminals 102 and setting a column voltage differential change $\Delta V_{col}=D$ of the column voltages $V_{col}$ while keeping the same driving voltage differentials $V_{Eink}$ by varying the common voltage $V_{CE}$ with a common voltage differential change $\Delta V_{CE}=D$, i.e., equal to the column voltage differential change $\Delta V_{col}$.

As will be shown in the following (FIGS. 8A-8L), an advantage of LVCD over HVCD is that there are less 'forbidden transitions', due to limitations of the TFT gate voltages (marked by an asterisk (*) in FIGS. 8A-8L).

Figure 7C:
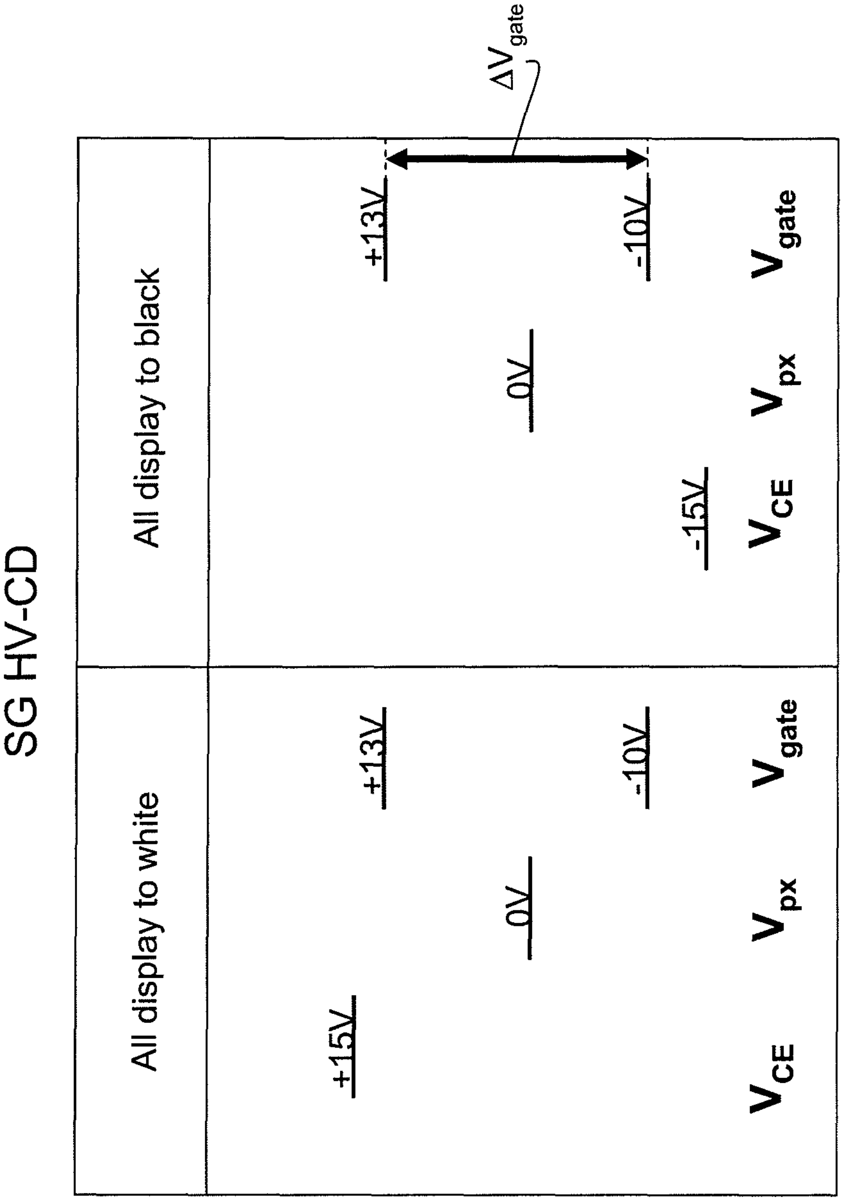
FIG. 7C shows voltage levels for SGHVCD.

FIG. 7C shows an alternative scheme dubbed 'scanning gate high voltage common driving' (SGHVCD). With SGHVCD the row electrode driver sticks to scanning of the rows all the time, also during the common driving periods. This scheme may be advantageous because the row electrode driver 520 then doesn't have to deviate from its normal (pixel driving) behavior. During common driving the data voltage is always 0V. This certainty still allows the use of adjusted gate voltages and a lower gate switching voltage swing $\Delta V_{gate}$ during the common driving period. Alternatively, the scheme shown in FIG. 7C could also be employed without using a common driver ($V_{CE}=0$) by subtracting in 15V from all voltage of SGHVCD to White and adding 15 to all voltages of SGHVCD to Black.

Figure 8B:
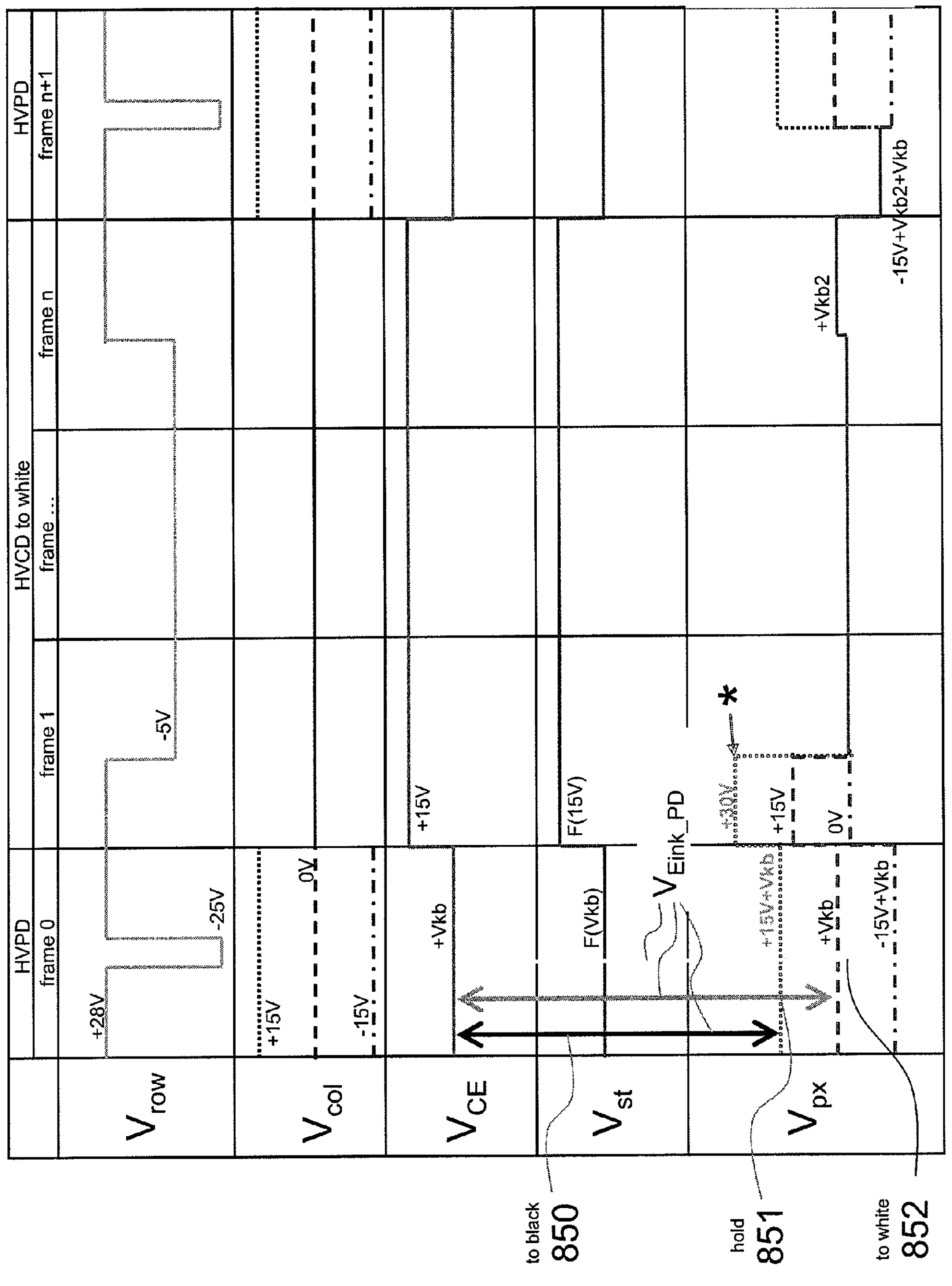
FIG. 8B shows voltage traces of HVPD and HVCD to White.
Figure 8C:
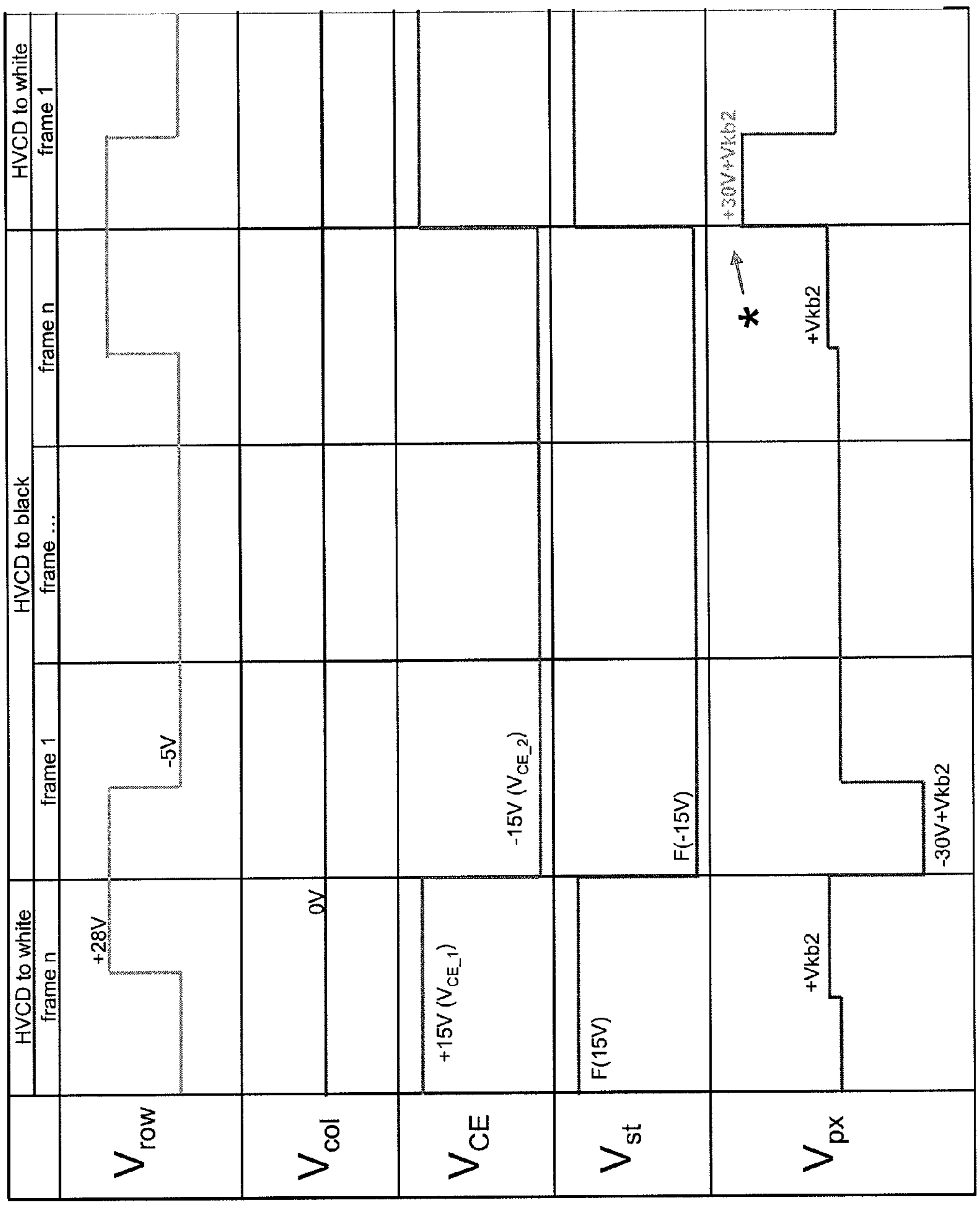
FIG. 8C shows voltage traces of HVCD to White and HVCD to Black.
Figure 8D:
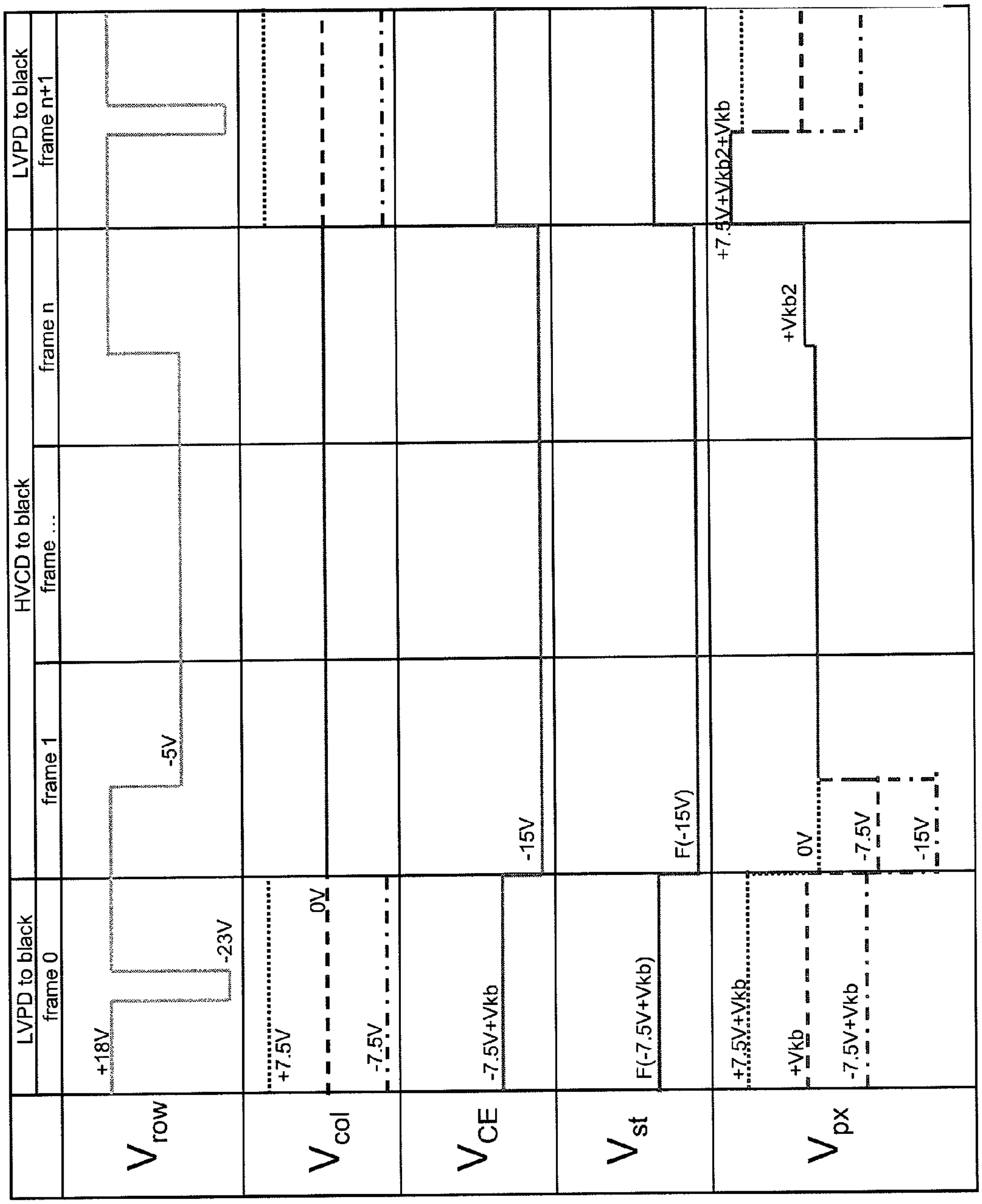
FIG. 8D shows voltage traces of LVPD to Black and HVCD to Black.
Figure 8E:
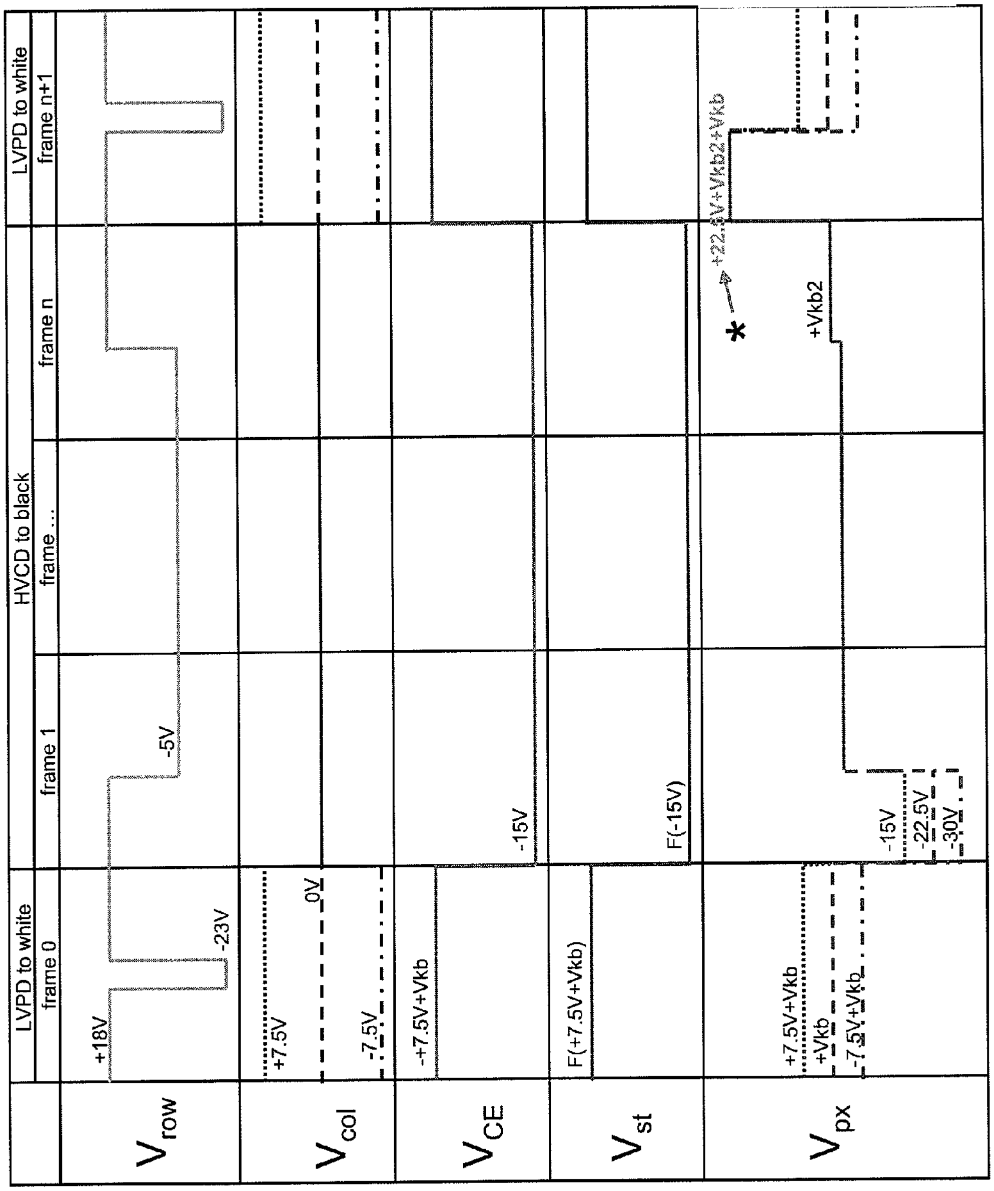
FIG. 8E shows voltage traces of LVPD to White and HVCD to Black.
Figure 8F:
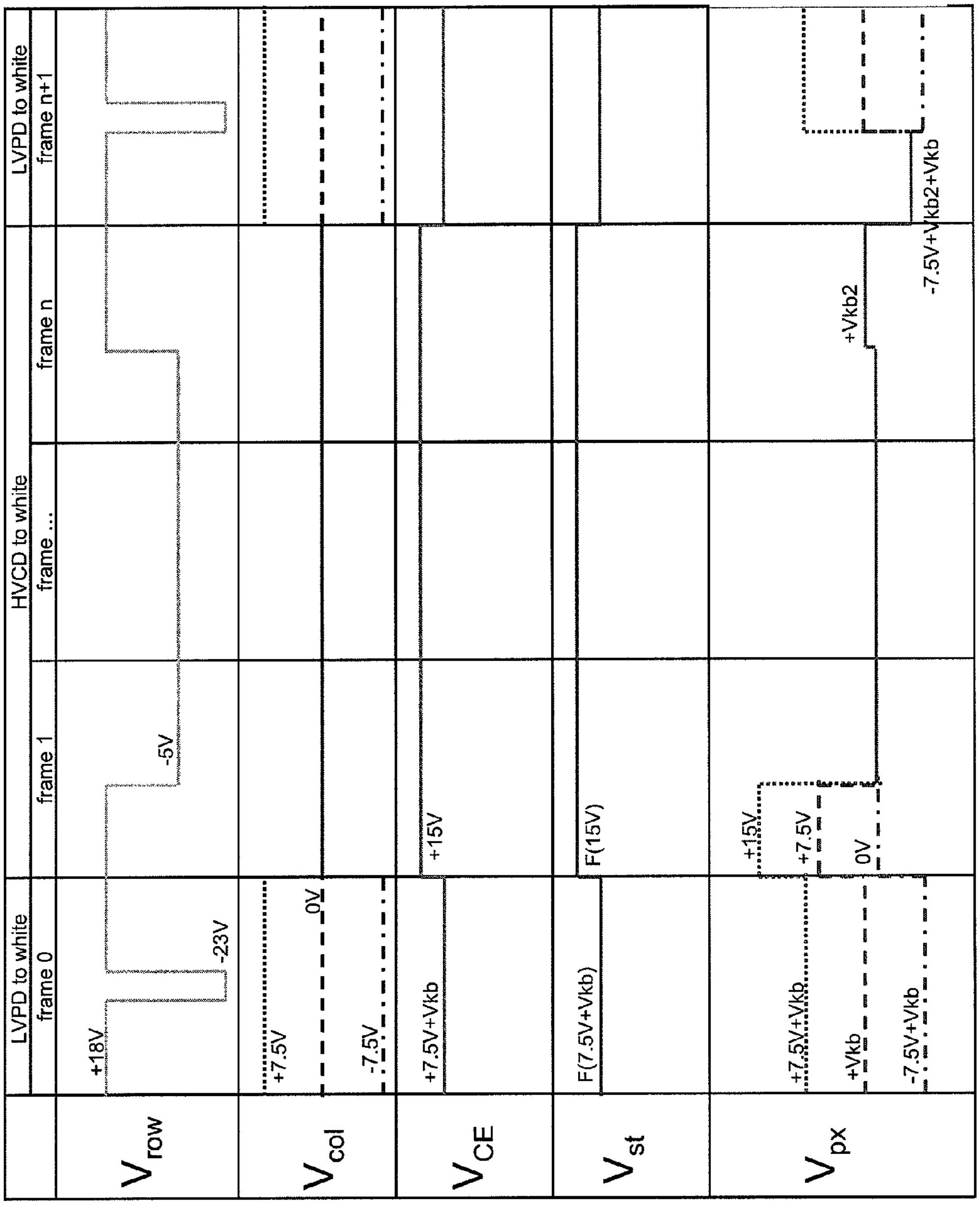
FIG. 8F shows voltage traces of LVPD to White and HVCD to White.
Figure 8G:
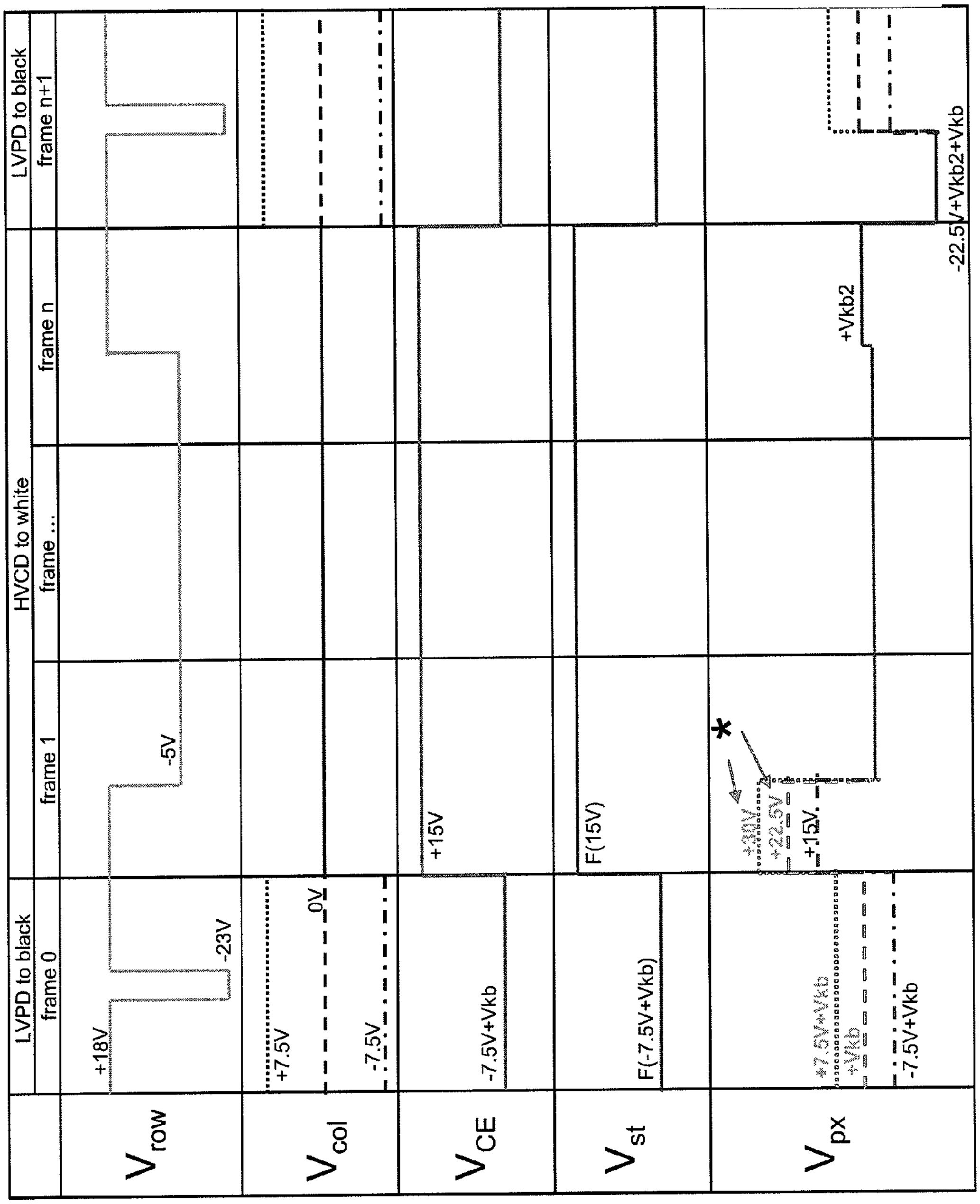
FIG. 8G shows voltage traces of LVPD to Black and HVCD to White.
Figure 8H:
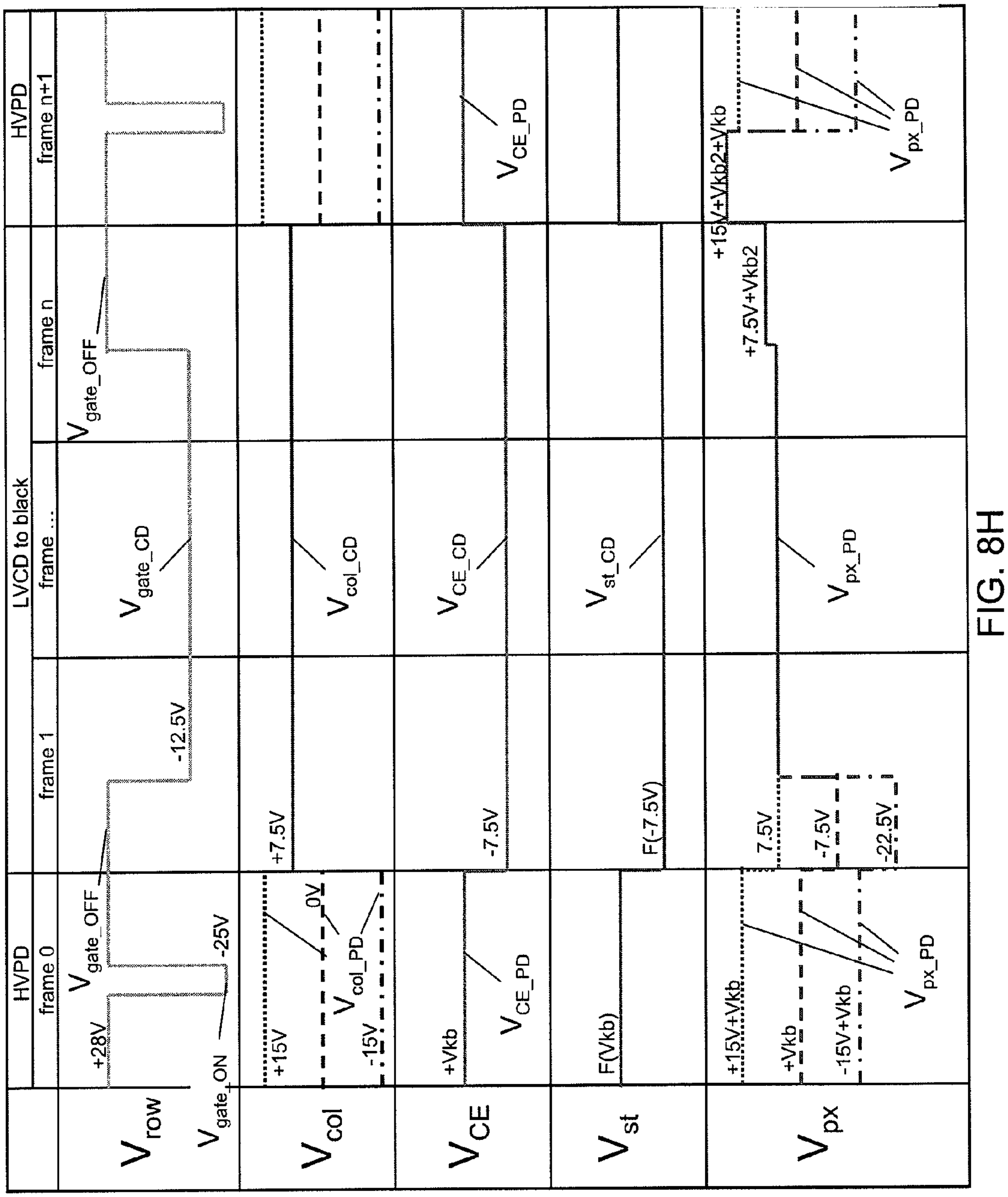
FIG. 8H shows voltage traces of HVPD and LVCD to Black.
Figure 8I:
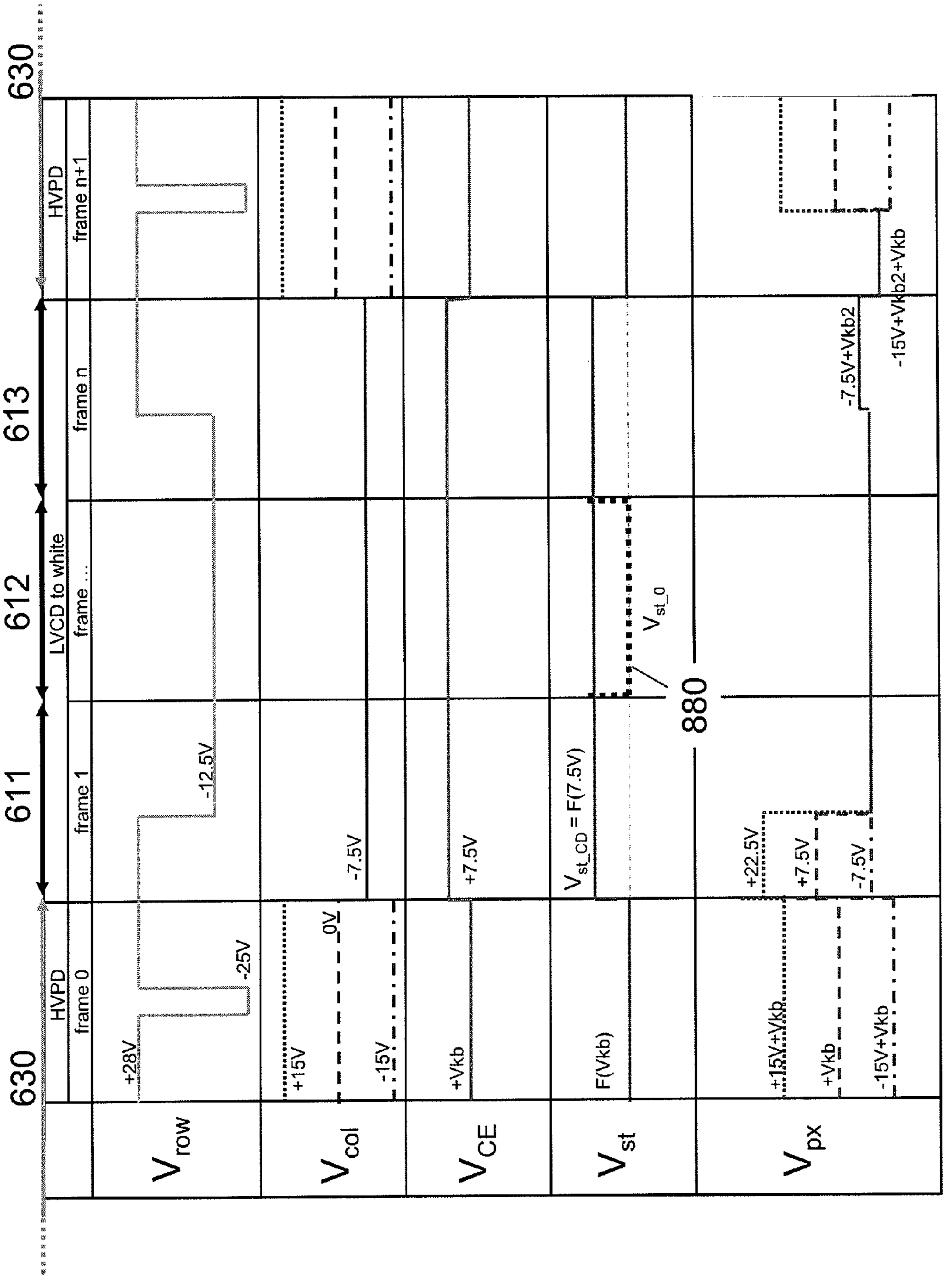
FIG. 8I shows voltage traces of HVPD and LVCD to White.
Figure 8J:
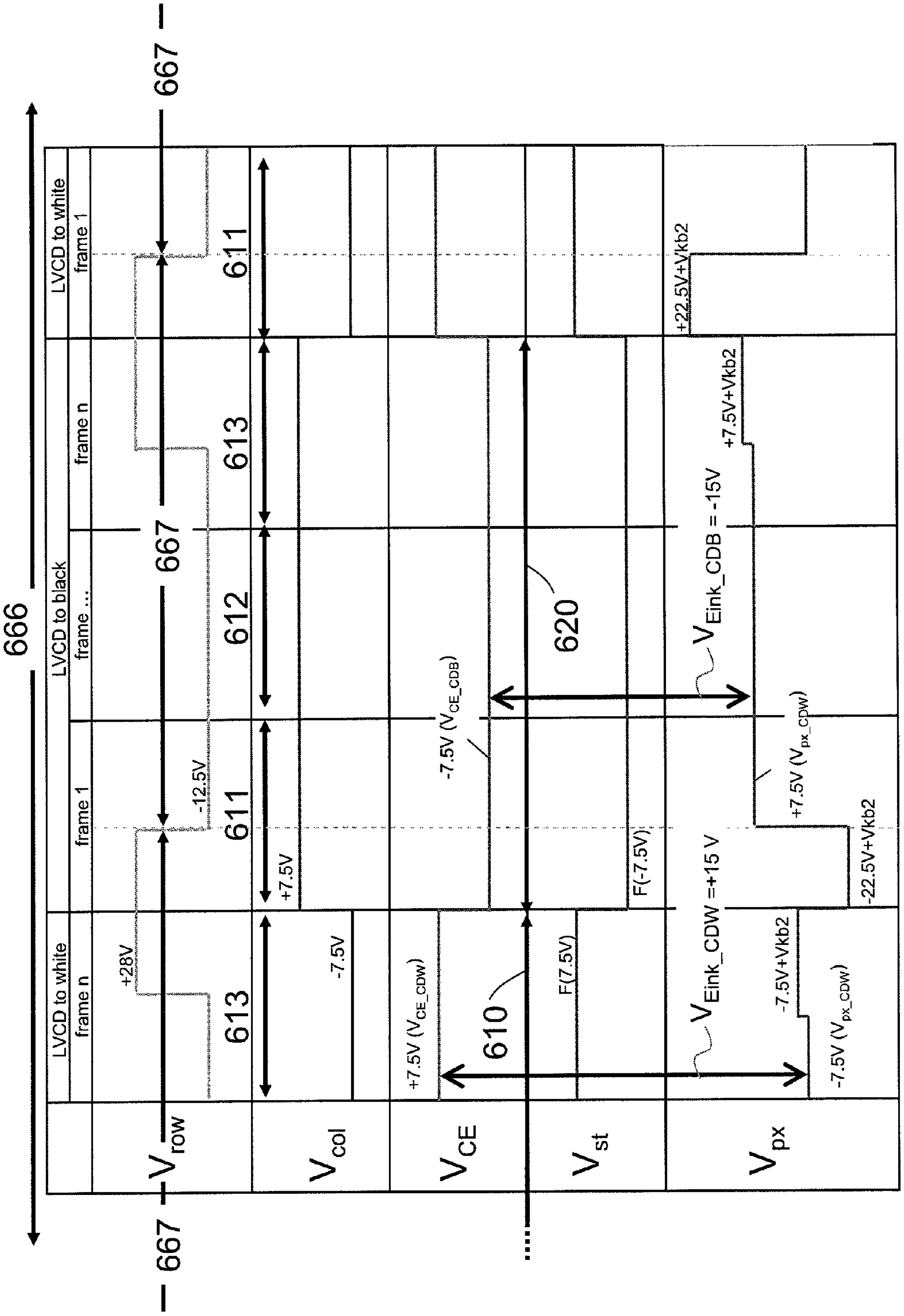
FIG. 8J shows voltage traces of LVCD to White and LVCD to Black.
Figure 8K:
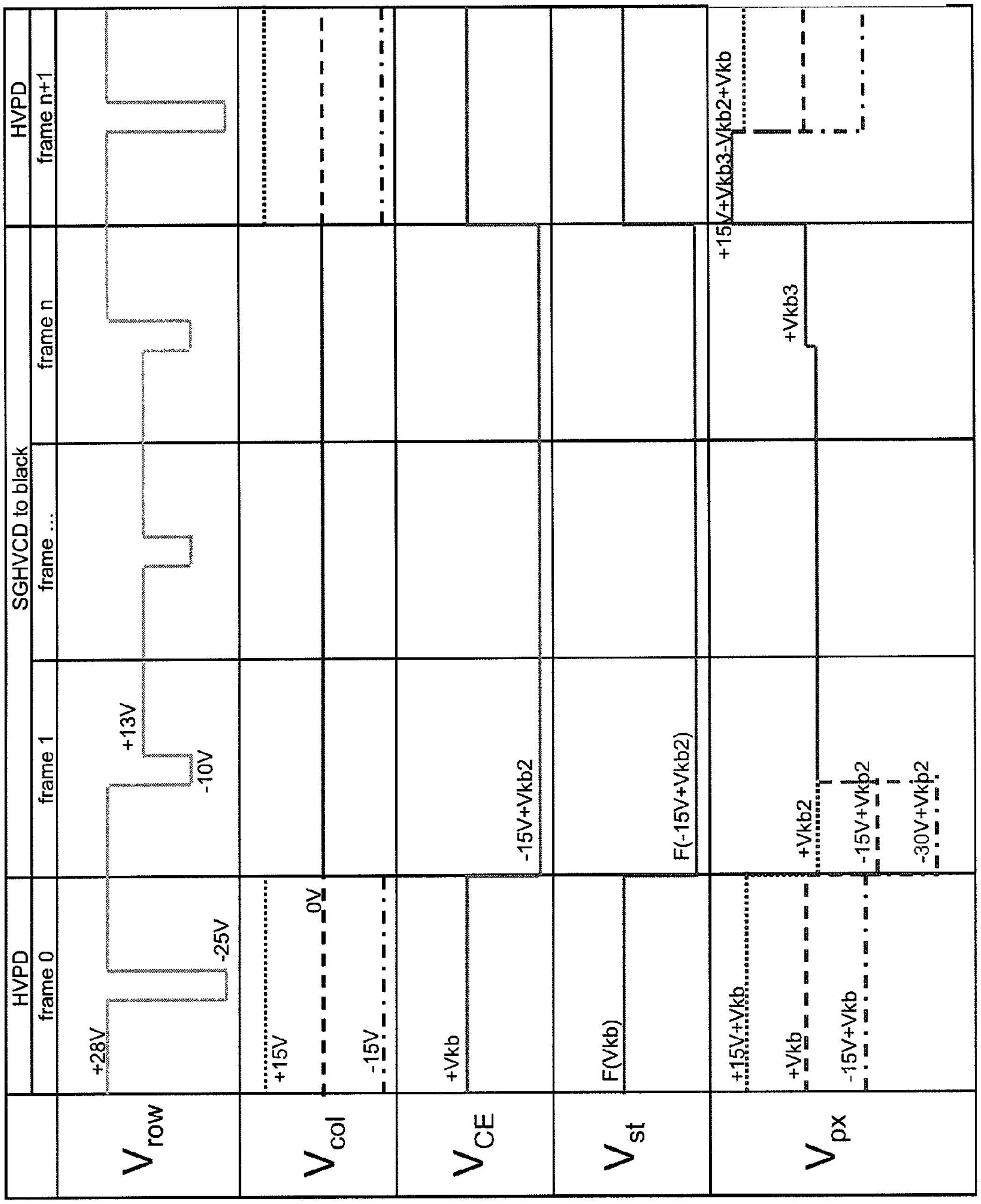
FIG. 8K shows voltage traces of HVPD and SGHVCD (scanning gate HVCD) to Black.
Figure 8L:
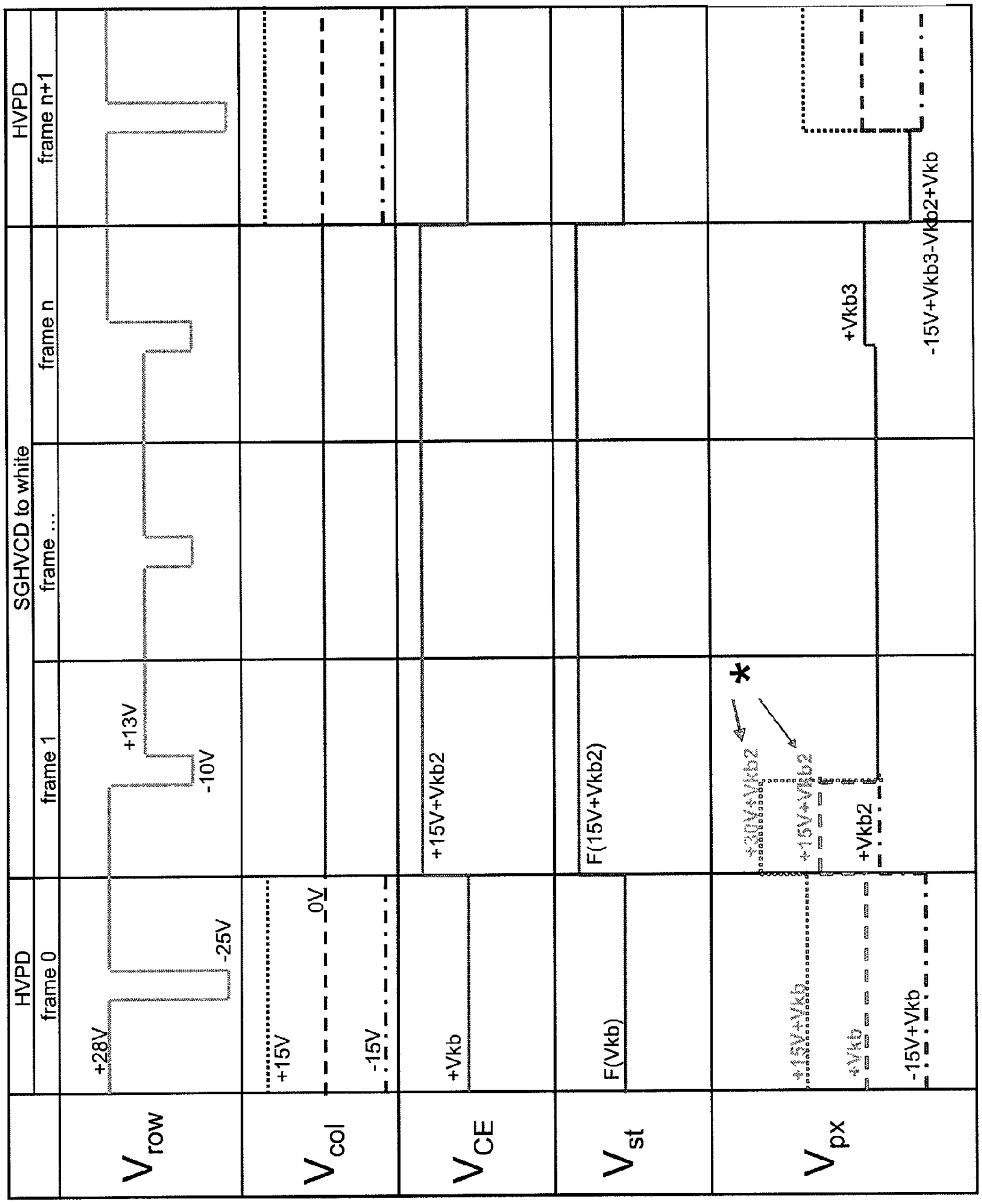
FIG. 8L shows voltage traces of HVPD and SGHVCD to White.
Figure 8M:
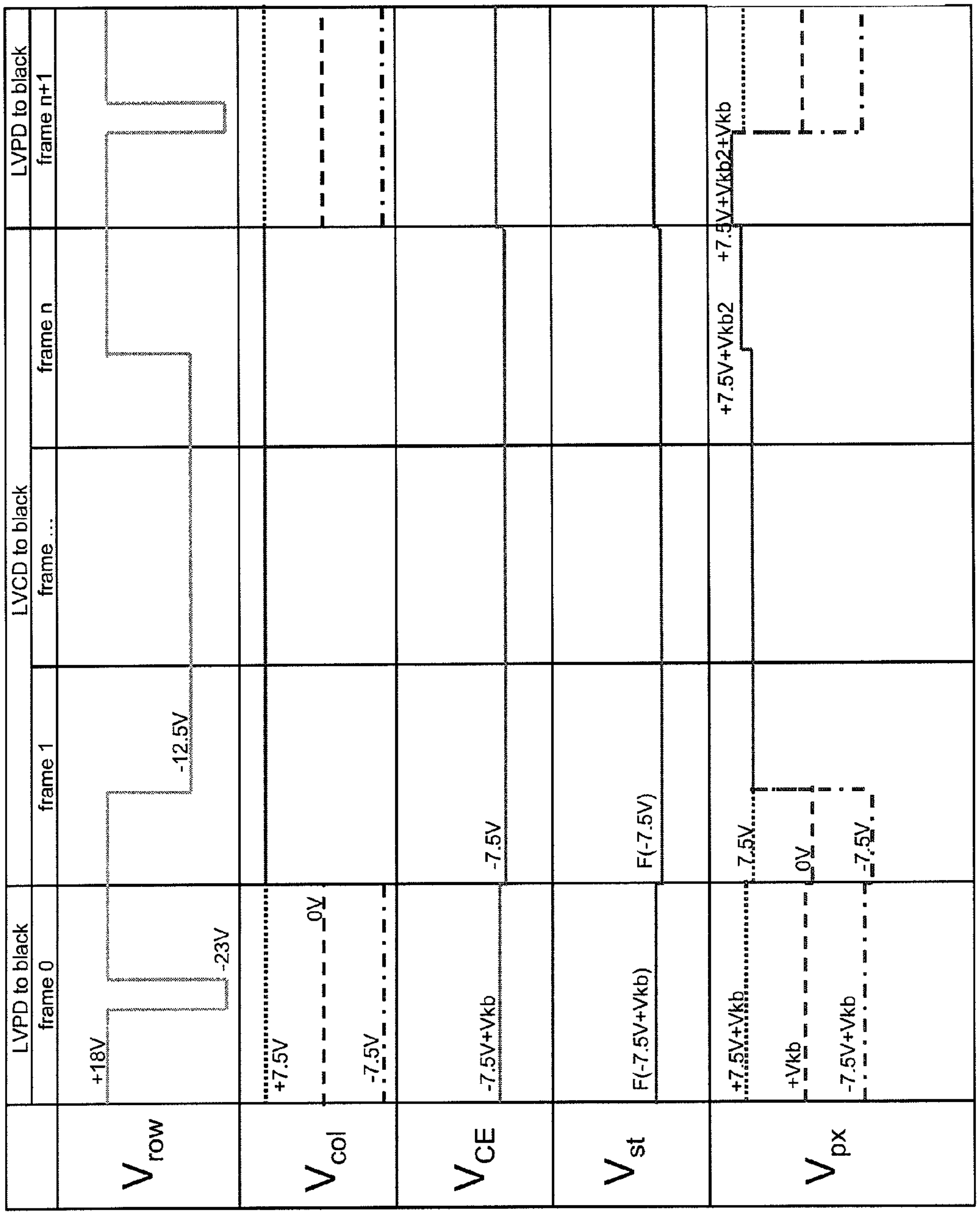
FIG. 8M shows voltage traces of LVPD to Black and LVCD to Black.
Figure 8N:
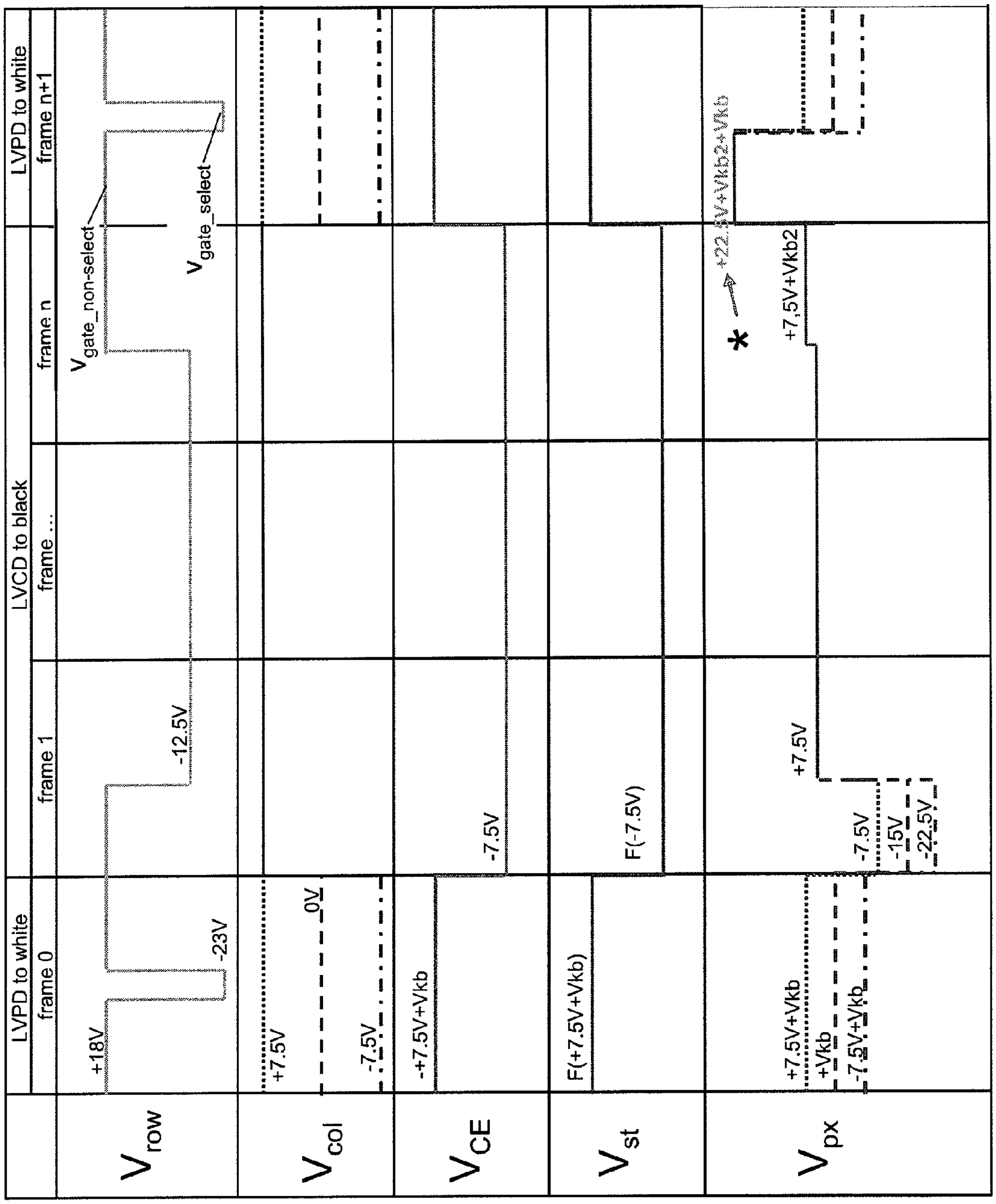
FIG. 8N shows voltage traces of LVPD to White and LVCD to Black.
Figure 8O:
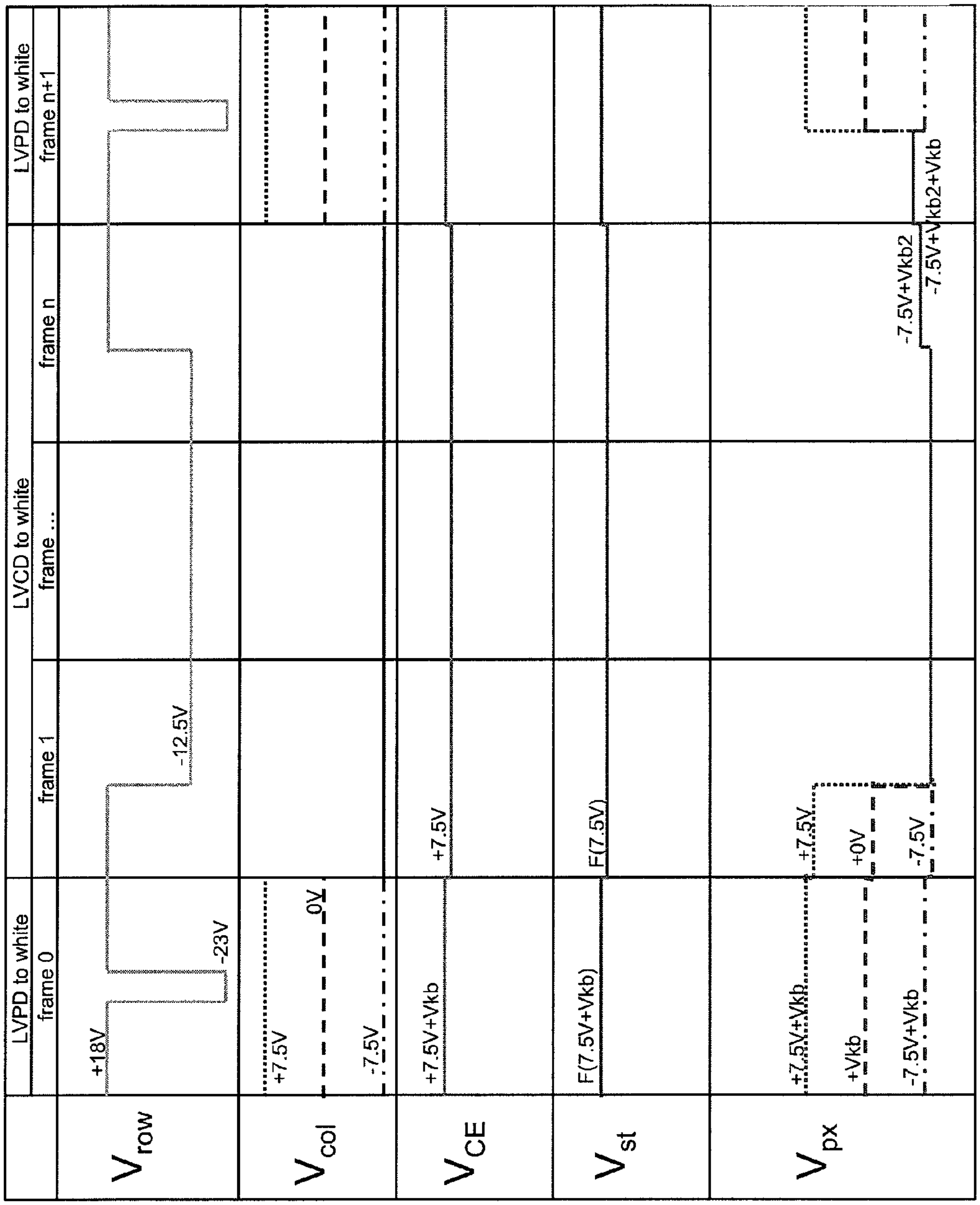
FIG. 8O shows voltage traces of LVPD to White and LVCD to White.
Figure 8P:
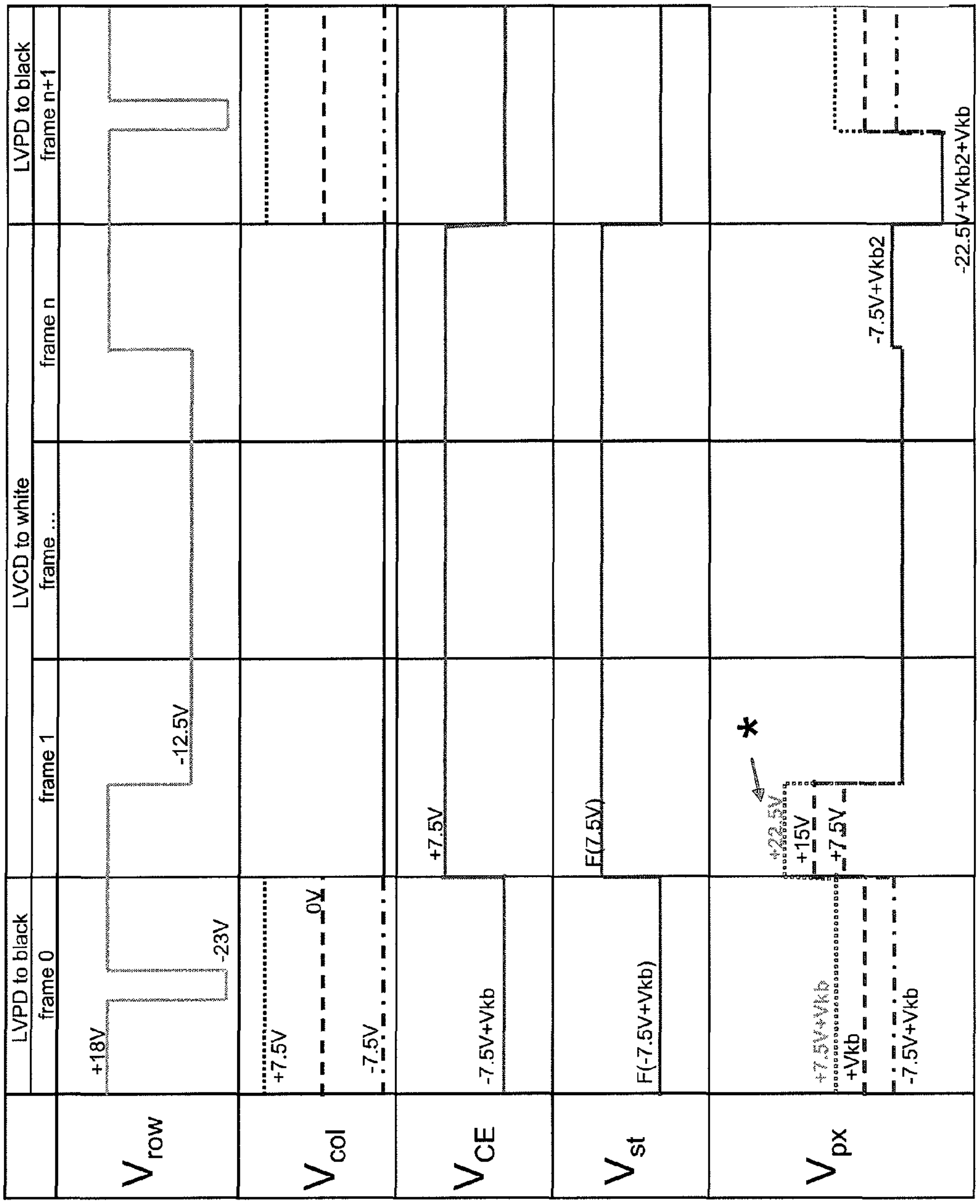
FIG. 8P shows voltage traces of LVPD to Black and LVCD to White.

FIGS. 8A-8P show voltage levels versus time at various nodes of the equivalent circuit (300 of FIG. 3 or 500 of FIG. 5A).

First of all, high voltage common driving (HVCD) combined with high voltage pixel driving (HVPD) will be studied in detail (FIGS. 8A-8C).

In FIG. 8A, it is shown that in the transition between a scan line driving phase 630 and a common driving phase 666, a transition frame is typically needed to switch all pixels to the new phase. These transition frames at the beginning and end of the common driving phase may comprise sequentially scanned (row-by-row) transitions wherein all rows are switched sequentially to and from the common driving phase. These transition frame are referred to as the common driving initialization and ending frames and are counted as part of the common driving phase. Accordingly, when switching the display 500 from normal Pixel Driving to Common Driving, such as in FIG. 8A, it is advantageous to switch the common voltage $V_{CE}$ (and storage voltage $V_{st}$) in initializing common frame 611, at the start of a first row selection sequence of a common driving phase 666. At this time all rows have a non-select voltage $V_{gate\_OFF}$. This means the transistors are closed and the pixel voltages $V_{px}$ are independent of the column voltages $V_{col}$. By changing the common voltage $V_{CE}$ and storage voltage $V_{st}$, the pixel voltages $V_{px}$ also change because they are coupled through the storage capacitor $C_{st}$ and pixel capacitance $C_{DE}$ (see FIG. 3). If the changing storage voltage is correctly adjusted to the changing common voltage, i.e. according to equation (5), the driving voltage differential $V_{Eink}$ over the pixels should not change as a result of this switch.

During the first row selection sequence in a common driving initialization frame 611 of a common driving phase 666, the rows are sequentially switched by a gate switching voltage swing $\Delta V_{gate}$ that brings the transistors 510 sequentially in a common driving gate voltage state 891. Only at this time are the pixel voltages $V_{px}$ sequentially switched to the common driving pixel voltages $V_{px\_CD}$ and the driving voltage differential $V_{Eink}$ sequentially changes to a common driving value $V_{Einks\_CD}$. The real moment that the common driving time period 667 starts is thus not determined by the (common) switching of the common voltage, but by the sequential switching of the transistors 510.

Similarly, at the end of a last row selection sequence, during a common driving ending frame 613, the row driver 520 is controlled to sequentially provide scanning row non-select voltages $V_{gate\_OFF}$ to the gate terminals G, for sequentially switching the transistors 510 to a non-conducting state 892. Pixel driving is resumed at the end of 613. Therefore, at that time all gates should be set to $V_{gate\_OFF}$. It is advantageous to scan all lines sequentially from $V_{gate\_CD}$ to $V_{gate\_OFF}$ during a common driving ending frame 613 because of the second kickback voltage Vkb2. All rows will experience this kickback voltage during the same time (but shifted) time period, i.e. from the moment the gates sequentially close at the end of frame 613 to the moment the gates sequentially open at the beginning of the pixel driving period 630.

At the end of this frame when the transistors 510 all are closed, the common voltage $V_{CE}$ and storage voltage $V_{st}$ are switched back to their nominal pixel driving values $V_{CE\_PD}$ and $V_{st\_PD}$, in such a way that the common driving voltage differential $V_{Eink\_CD}$ does not change, i.e. according to equation (5).

Only during a first row selection sequence of a pixel driving phase 630, will the pixel voltages be sequentially reset to a plurality of pixel driving values $V_{px\_PD}$, and will the common driving time period 667 sequentially ends for all pixels 555.

By using the sequential switching of the transistors at the beginning and ending of the common driving time period, all pixels will have experience the same common driving voltage differential $V_{Eink\_D}$ during a same total time period. In effect the common driving time period 667 is thus the same but shifted in time for all pixels 555 because of this driving scheme. This can be advantageous if it is desired that all pixels are driven similarly. In fact by additionally keeping the transistors in a common driving gate voltage state that conducts during the common driving phase 612, the voltages on the pixel terminals are maintained and are not influenced, for example, by non-uniformities of the pixels or TFTs. In an advantageous embodiment the common driving period is signaled by a common driving flag that is set in accordance with the LUT. For example, the initialization frame 611 can be triggered by the raising of the common driving flag $F_{CD}$, and the ending frame 613 can be triggered by the lowering of the common driving flag $F_{CD}$. Furthermore, controller or row driver could monitor the flag to adjust the gate voltages during the common driving period 666 to lower voltages and/or maintaining a constant common driving voltage $V_{gate\_CD}$ on the gates G.

FIG. 8A shows voltage traces of HVPD and HVCD to Black. Frame 0 is the last HVPD frame. Active-matrix displays are driven one row-at-a-time. During a row selection sequence 888 of pixel driving, all the rows are sequentially selected by applying a voltage that turns on the TFTs, i.e., changes the TFTs from the non-conducting 892 to the conducting state 890.

In FIG. 8A, frame 1 is the first HVCD frame, where the on-off switching of the TFTs is turned off and instead the TFT is put into a semi-conductive state 891. Frame n is the last HVCD frame where the TFT is switched to non-conducting. Frame n+1 is the first HVPD frame again. In frame 0 all lines are scanned and data (+15V, 0V or −15V) is written on the pixels. During frame 0 three different voltages are shown that correspond to HVPD to Black 850 ($V_{px}$=+15V), pixel hold 851 ($V_{px}$=0V), and HVPD to White 852 ($V_{px}$=+15V). The driving voltage for the pixels at each moment equals $V_{Eink}=V_{CE}-V_{px}$.

At the start of frame 1 the common voltage is switched to −15V for HVCD to Black, the storage voltage is switched to F(−15V), i.e., full compensation to maintain the same voltage over the $E_{ink}$ (see, also equation (8)), and the column voltage is set to 0V. It is noted that at this moment of common switching nothing thus changes for the voltage differential over the pixel $V_{Eink}$ because the TFT is closed and the pixels' voltages move concurrently with the common voltage.

In frame 1 the lines are scanned and switched from non-conducting state 892 to common driving gate voltage state 891, which means that the TFTs are conducting. This ensures that exactly at this desired point in time the pixels are switched to 0V and kept at this voltage. From this point onward the voltage differential $V_{Eink}$ is changed for the switched pixels to −15V, i.e. driving to Black. In frame 2 to frame n−1, not a single voltage needs to be changed.

During the common driving period 610 there is an additional option to switch the storage voltage $V_{st}$ temporarily to a lowered voltage $V_{st\_0}$ (e.g. 0V) during a period 880 where the TFT is in a conducting state 890 or common driving gate voltage state 891. This can be attractive to reduce power usage and stress over storage-column crossings Frame n is used to activate row-to-row addressing again. All lines are scanned and switched from semi-conducting 891 to non-conducting 892. At the start of frame n+1 the common is switched back to the HVPD value +Vkb, the storage voltage to F(Vkb) and writing data from the columns is resumed. The scanning sequence of the lines ensures again that exactly at the desired point in time the voltages over the $E_{ink}$ are switched at the start of pixel driving phase 630, so that each pixel has had the same time period of common driving 610.

Vkb is the kickback due to switching the gate line from $V_{gate\_ON}$ (=−25V) to $V_{gate\_OFF}$ (=+28V). Vkb2 is the kickback due to switching the gate line from $V_{gate\_CD}$ (=−5V) to $V_{gate\_OFF}$.

Kickback refers to the following phenomenon. During the conducting state of the TFT ($V_{row}$=−25V) or common driving gate voltage state ($V_{row}$=−5V) the small gate-drain parasitic capacitor $C_{gd}$ and the capacitors $C_{st}$ and $C_{DE}$ will be charged (FIGS. 3 and 5). At the moment that the TFT is switched off from conducting state 890 or common driving gate voltage state 891 to non-conducting state 892, $V_{row}$ will be switched to +28V and the voltage over capacitor $C_{gd}$ will increase by 53V (from −25V to +28V) or 33V (from −5V to +28V), respectively. Charges will move from $C_{gd}$ to $C_{st}$ and $C_{DE}$ resulting in an increase of $V_{px}$ just after the TFT is switched off. Because $C_{gd}$ is relatively small compared to the other capacitors, the increase of the potential of $V_{px}$ is also small.

In general, a small additional $\Delta V_{CE}$ is required on top of the mentioned $V_{CE}$ voltages. The reason is that parasitic capacitances (e.g., $C_{gd}$) in the pixel cause a small voltage jump when the row changes from low to high voltage. This jump is called the kickback voltage $V_{KB}$ and can be calculated as follows:

$$\Delta V_{KB}=(\Delta V_{row})(C_{gd}/C_{TOTAL}).\ \text{(kickback voltage)}$$

This must be added to $V_{CE}$ in order to have the right $V_{Eink}$. Thus, it should be understood that this small additional kickback voltage should be added to all the described $V_{CE}$ voltages It is noted that while this is true for pixel driving frames, it is not necessarily true for all common driving frames e.g. when the TFTs are kept in a common driving gate voltage state and there is no kickback because of closing gates.

FIG. 8B is similar to FIG. 8A, but now the common driving is to White in stead of black. For common driving to White the only difference is the value for the common (+15V). This does have an important consequence: it is not allowed to have pixels switching to Black (+15V+Vkb) in frame 0, the last HVPD frame, as this gives a pixel voltage (+30V) during the first part of frame 1 that cannot be maintained, i.e., higher than the gate voltage (+28V) during the non-conducting state of the TFT.

FIG. 8C shows voltage traces of HVCD to White switching to HVCD to Black and back. From the voltage traces t is shown that, for a similar reason as in FIG. 8B, directly switching from HVCD to Black to HVCD to White is not possible, while the other way around it is.

In FIGS. 8D-8G the voltage traces for LVPD to Black or White combined with HVPD to Black or White are collected.

FIG. 8D is shows voltage traces of low voltage pixel driving (LVPD) to Black switching to HVCD to Black and back again. This is similar to FIG. 8A, except that the common voltage $V_{CE}$ during pixel driving is set to −7.5V instead of 0V allowing the pixel voltages to be lower while still maintaining a voltage differential of −15V. Also the gate voltages may be lowered to +18V and −23V for non-conducting and conducting states, respectively. These lower voltages generally reduce stresses over the TFTs. A disadvantage of LVPD is that it is no longer possible to simultaneously drive some pixels to White either slow or fast.

FIG. 8E is similar to FIG. 8D, except that now there is LVPD to White in stead of black. As can be seen there is a problem when switching back from HVCD to Black to LVPD to White.

FIG. 8F shows voltage traces of LVPD to White switching to HVCD to White and back again. As can be seen, no particular problems due to the resulting pixel voltages occur.

FIG. 8G is similar to FIG. 8F, instead that it shows LVPD to Black instead of white. As can be seen problems occur when switching from LVPD to Black to HVCD to White.

In FIGS. 8H-8J the voltage traces for LVCD to Black and LVCD to White combined with HVPD are collected together with the voltage traces for transitions between LVCD to White and LVCD to Black.

FIG. 8H shows voltage traces of HVPD switching to LVCD to Black and back again.

FIG. 8I shows voltage traces of HVPD switching to LVCD to White and back again. As can be seen, unlike for HVCD to White (FIG. 8B), for LVCD to White it is allowed to have pixels switching to Black (+15V+Vkb) in frame 0, the last HVPD frame.

FIG. 8J shows voltage traces of LVCD to White and LVCD to Black. It is shown that it is also possible to directly switch from LVCD to Black to LVCD to White, which was not possible for HVCD (see FIG. 8C). During a first common driving period 610 a common driving voltage $V_{CE\_CDW}$ is applied to the common terminal 102 to drive the pixels to White and during a subsequent common driving period 620 a second common voltage $V_{CE\_CDB}$ is applied to the common terminal 102 to drive the pixels to Black. Simultaneously with the common voltages, the pixel voltages $V_{px}$ are switched to opposite polarities $V_{px\_CDW}$ and $V_{px\_CDB}$, respectively. In this figure the common driving initialization frame 611 and common driving ending frame 613 are also shown. These frames are advantageous in ensuring that all pixels are driven with the same driving voltages and during the same common driving time periods 667, as discussed before.

In another embodiment, shown in FIG. 6B, the common driving phase 666 is followed up by a pixel driving phase 630 where a pixel driving common voltage $V_{CE\_PD}$ is applied to the common terminal 102 while a plurality of pixel driving pixel voltages $V_{px\_PD}$ is applied to the pixel terminals 101 to drive the pixels from the common state 604 to any particular destination state 607.

Common driving has a number of advantages over regular pixel driving, HVPD or LVPD:

1. Common driving is typically insensitive for non-uniformities in the backplane (e.g. TFT on-current or TFT off-current) and in the frontplane (e.g. cell gap resistance). Also, during common driving there will not be a drop in pixel voltage due to leakage through the electrophoretic display effect during the hold time, as there is no hold time. This implies that common driving is inherently faster, more uniform and less sensitive to image history.

2. Using a DAC (digital to analog converter) the common voltage to be used in a certain common driving period can be fine-tuned, in order to at the end of the common drive period end up in a very specific condition. This is helpful in LUT creation.

3. Common driving is very light for the backplane. The stress over the TFT and the row-column crossings are limited e.g. to 5V. This implies that common driving will postpone breakthrough, especially if one realizes that the stress over TFT and row-column crossings is opposite in sign to the dominant stress during pixel driving.

4. It is possible to set the storage voltage to, for example, 0V during frame 2 to frame n−1 of the common driving period, as long as it is switched back to the correct value a number of line times before the start of frame n. This can be attractive to reduce power and stress over storage-column crossings.

FIGS. 8K and 8L show two particular embodiments of 'scanning gate high voltage common driving' (SGHVCD), also mentioned in FIG. 7C, where the scanning of the gates is not disabled during the common driving period.

FIG. 8K shows voltage traces of HVPD and SGHVCD to Black.

FIG. 8L shows voltage traces of HVPD and SGHVCD to White. Here again a problem occurs when switching from both HVPD to Black and 'pixel hold' to SGHVCD to White.

The ability to keep the normal routine of gate scanning active during the common phase can be advantageous from a point of view of circuitry design, however advantages 1 and 4, identified above, do not hold for this alternative embodiment of SGHVCD. On the other hand advantage 2 does hold and advantage 3 holds partially: power consumption is lower and stress over the row-column crossings and in the TFT is lower as well for common driving than for pixel driving.

FIGS. 8M-8P show combinations of Low Voltage Pixel Driving (LVPD) and Low Voltage Common Driving (LVCD). From these figures it can be concluded that the pixel voltages Vpx that occur during some transitions (marked with an asterisk *) between these two types of driving can not be sustained by the transistors.

For example FIG. 8N shows that a transition between LVCD to Black and LVPD to White can lead to pixel voltages $V_{px}$ that cannot be sustained due to the lower gate voltages used during LVPD, in particular the non-select voltage $V_{gate\_non\text{-}select}$ of +18V that is applied to the gates G of the transistors is lower than the pixel voltages $V_{px}$ of +22.5V that are present at the drains D of the transistors. This pixel voltage originates from the common driving pixel voltage $V_{px\_CD}$ of +7.5V being raised by the voltage swing of the common voltage $V_{CE}$ from the common driving value $V_{CE\_CD}$=−7.5V to the pixel driving value $V_{CE\_PD}$=+7.5V. It is noted that a transition from LVPD to white to LVCD to black is possible.

A similar case occurs in FIG. 8P, where a transition between LVPD to Black and LVCD to White leads to pixel voltages that cannot be sustained by the provided gate voltages $V_{row}$. It is noted that a transition from LVCD to white to LVPD to black is possible.

Finally it is observed in FIGS. 8M and 8O that transitions both ways between LVPD to black and LVCD to black are possible as well as between LVPD to white and LVCD to white.

In an embodiment shown in FIG. 6B the common driving phase 666 comprises a first phase 610 of LVCD to Black followed by a second phase 620 of LVCD to White. The pixel driving phases 630 and 631 can be any of the types HVPD, LVPD to white, or LVPD to black. All possible transitions between these phases are allowed as demonstrated in the FIGS. 8A-8P. It is noted that in the transition between LVCD to Black and LVCD to White, the higher gate voltage for $V_{gate\_OFF}$ of HVPD (+28V) is used. It is further noted that this preferred embodiment is based on the currently used combination of p-type TFTs and negative white particles/positive black particles. For example, for oppositely charged particles the common driving sequence would be LVCD to White and then LVCD to Black.

The various embodiments offer certain advantages, such as lowering the column-data-drain voltages (e.g., from 15V to 7.5V) and/or lowering the row or gate voltages accordingly during addressing of an electrophoretic display without losing the ability to generate grey levels. This makes it possible to use a larger range of commercially available drivers. A further advantage includes decreasing the image update time of the display. Of course, it is to be appreciated that any one of the above embodiments or processes may be combined with one or with one or more other embodiments or processes to provide even further improvements in finding and matching users with particular personalities, and providing relevant recommendations.

It is understood that this invention is especially suited for applications with electrophoretic displays, e.g. E Ink or SiPix, however in general the invention can be applied for any display type that is bistable and not too fast, which implies that generation of grey scales can be accomplished by pulse width modulation.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item(s) or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A display device comprising:

a plurality of transistors, each comprising a source terminal, a gate terminal, and a drain terminal;

a column driver connected to said source terminals for providing column voltages ($V_{col}$);

a row driver connected to said gate terminals for providing a row select voltage;

a plurality of pixels, each having a pixel state that is driven by a driving voltage differential ($V_{Eink}$) between a pixel voltage ($V_{px}$) applied to a pixel terminal and a common voltage ($V_{CE}$) applied to a common terminal, said pixel terminal connected to a drain terminal of a corresponding transistor;

a common driver for providing a variable common voltage ($V_{CE}$) to the common terminals; and a controller controlling the operation of the column driver, the row driver, and the common driver for driving said plurality of pixels, said controller arranged to provide a control sequence of:

a scan line driving phase during which the column driver is controlled to provide a plurality of driving column voltages ($V_{col\_PD}$) to the source terminals and the row driver is controlled to provide scanning row select voltages to the gate terminals, for sequentially updating each pixel having an initial pixel state with said plurality of driving column voltages ($V_{col\_PD}$) to attain, for each initial pixel state, an initial common pixel state; and a common driving phase during which the column driver is controlled to provide a uniform column voltage ($V_{col\_CD}$) to the source terminals for updating said plurality of pixel voltages ($V_{px}$) with a uniform column voltage ($V_{col\_CD}$) and wherein the row driver is controlled to provide row select voltages with a gate voltage swing ($\Delta V_{gate}$) that is lower during the common driving phase than during the scan line driving phase or wherein the row driver is controlled to provide a uniform row select voltage ($V_{gate\_CD}$) during multiple scan periods for keeping the transistors open in a conducting state, thereby maintaining said uniform column voltage ($V_{col\_CD}$) on the pixel terminals so as to drive each pixel from a respective initial common pixel state to a respective final common state, wherein the common driver is controlled not to change the common voltage when one of the rows is selected.

2. The display device according to claim 1, wherein the common driver is controlled by the controller to switch the common voltage ($V_{CE}$) at the start and/or at the end of the common driving phase and wherein during a common driving initialization frame the row driver is controlled to sequentially provide scanning row select voltages ($V_{gate\_CD}$) to the gate terminals, for sequentially updating the plurality of pixel voltages ($V_{px}$) with a uniform column driving voltage ($V_{col\_CD}$).

3. The display device according to claim 2, wherein the storage driver is arranged to switch the storage voltage to a lower absolute voltage level ($V_{st\_0}$) during at least part of the common driving phase.

4. The display device according to claim 1, wherein the row driver is controlled by the controller to sequentially provide, during a common driving ending frame, scanning row non-select voltages ($V_{gate\_OFF}$) to the gate terminals, for sequentially switching the transistors to a non-conducting state.

5. The display device according to claim 1, additionally comprising a storage driver for providing a storage voltage ($V_{st}$) to a storage capacitor, connected between the storage driver and the pixel terminal of the pixel, having a storage voltage swing $\Delta V_{st}$ being proportional to a common voltage swing.

6. The display device according to claim 1 wherein the row driver is controlled by the controller to provide, in the common driving phase, a uniform row select voltage ($V_{gate\_CD}$) during multiple scan periods with a row select voltage swing that is lower during the common driving phase than during the scan line driving phase.

7. The display device according to claim 1 wherein the controller comprises a look up table, the look up table storing scan line driving values for controlling the column driver, during the scan line driving phase, to provide driving column voltages so as to drive the pixels from any pixel state to the initial common pixel state and, during a sequential scan line driving phase from the final common state to any further pixel state; said controller further arranged to drive said pixels in the common phase from the initial common pixel state to an intermediate common pixel state equal to an extreme pixel state ($P_E$) for increasing a uniformity of the pixel states.

8. The display device according to claim 7, further comprising a common driving flag that is set in accordance with the look up table to indicate the status of the common driving period and wherein the controller comprises switching circuitry to switch from the scan line driving phase to the common driving phase as a result of the common driving flag.

9. The display device according to claim 1 wherein for each pixel a respective initial common pixel state is adjusted as a function of the initial pixel state to uniformize the final common pixel state.

10. The display device according to claim 1 wherein said transistor is a TFT.

11. A method for driving a display device comprising:

providing a plurality of transistors, each comprising a source terminal, a gate terminal, and a drain terminal;

providing a column driver connected to said source terminals for providing column voltages ($V_{col}$);

providing a row driver connected to said gate terminals for providing a row select voltage;

providing a plurality of pixels, each pixel having a pixel state that is driven by a driving voltage differential ($V_{Eink}$) between a pixel voltage ($V_{px}$) applied to a pixel terminal and a common voltage ($V_{CE}$) applied to a common terminal, said pixel terminal connected to a drain terminal of a corresponding transistor; and providing a common driver for providing a variable common voltage to the common terminals controlling the operation of the column driver and the row driver for driving said plurality of pixels in a control sequence comprising:

a scan line driving phase during which the column driver is controlled to provide a plurality of driving column voltages ($V_{col\_PD}$) to the source terminals and the row driver is controlled to provide scanning row select voltages to the gate terminals, for sequentially updating each pixel having an initial pixel state with said plurality of driving column voltages ($V_{col\_PD}$) to attain, for each initial pixel state an initial common pixel state; and a common driving phase during which the column driver is controlled to provide a uniform column voltage ($V_{col\_CD}$) to the source terminals for updating said plurality of pixel voltages ($V_{px}$) with a uniform column voltage ($V_{col\_CD}$) and wherein the row driver is controlled to provide row select voltages with a gate voltage swing ($\Delta V_{gate}$) that is lower during the common driving phase than during the scan line driving phase or wherein the row driver is controlled to provide a uniform row select voltage ($V_{gate\_CD}$) during multiple scan periods for keeping the transistors open in a conducting state, thereby maintaining said uniform column voltage ($V_{col\_CD}$) on the pixel terminals so as to drive the pixels from the initial common pixel state to a respective final common state, wherein the common voltage is not changed when one of the rows is selected.

12. The method according to claim 11, wherein the common voltage ($V_{CE}$) is switched at the start and/or at the end of the common driving phase and wherein during a common driving initialization frame row select voltages ($V_{gate\_CD}$) are sequentially provided to the gate terminals, for sequentially updating the plurality of pixel voltages ($V_{px}$) with a uniform column driving voltage ($V_{col\_CD}$).

13. The method according to claim 11 wherein the row driver is controlled to provide, in the common driving phase, a uniform row select voltage ($V_{gate\_CD}$) during multiple scan periods with a row select voltage swing that is lower during the common driving phase than during the scan line driving phase.

14. The method according to claim 11, additionally comprising the step of providing a variable common voltage ($V_{CE}$) to the common terminals having a common voltage swing and providing a storage voltage ($V_{st}$) to a storage capacitor, connected to the pixel terminal having a storage voltage swing $\Delta V_{st}$ being proportional to the common voltage swing.

15. The method according to claim 11 wherein the column driver and the row driver are controlled using a look up table, the look up table storing scan line driving values for controlling the column driver, during the scan line driving phase, to provide driving column voltages so as to drive the pixels from any pixel state to the initial common pixel state and, during a sequential scan line driving phase from the final common state to any further pixel state; and the column driver and the row driver are further controlled to drive said pixels in the common phase from the initial common pixel state to an intermediate common pixel state equal to an extreme pixel state ($P_E$) for increasing a uniformity of the pixel states.

16. The method according to claim 15 wherein said look up table stores for each pixel a respective initial common pixel state that is adjusted as a function of the initial pixel state to uniformize the final common pixel state.

17. The method according to claim 15 wherein said look up table stores a common driving flag that is set in accordance with the look up table to indicate the status of the common driving period and the control sequence is switched from the scan line driving phase to the common driving phase as a result of the common driving flag.

* * * * *